(12) United States Patent
Okamoto et al.

(10) Patent No.: US 7,686,205 B2
(45) Date of Patent: Mar. 30, 2010

(54) METHOD OF JOINING MEMBERS HAVING DIFFERENT THERMAL EXPANSION COEFFICIENTS

(75) Inventors: Kenji Okamoto, Wako (JP); Takeshi Kato, Wako (JP); Kenichi Nonaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 11/826,756

(22) Filed: Jul. 18, 2007

(65) Prior Publication Data

US 2008/0017695 A1 Jan. 24, 2008

(30) Foreign Application Priority Data

Jul. 19, 2006 (JP) ............... 2006-197401
Jun. 14, 2007 (JP) ............... 2007-157752

(51) Int. Cl.
*B23K 31/02* (2006.01)
(52) U.S. Cl. .................. 228/122.1; 228/246; 228/248.1
(58) Field of Classification Search ................. 228/248; 257/706
See application file for complete search history.

(56) References Cited

U.S. PATENT DOCUMENTS

| | | | | |
|---|---|---|---|---|
| 4,903,886 | A * | 2/1990 | Schwarzbauer | 228/106 |
| 5,561,321 | A * | 10/1996 | Hirano et al. | 257/700 |
| 6,611,056 | B2 * | 8/2003 | Okamoto et al. | 257/706 |
| 6,742,700 | B2 * | 6/2004 | Makino et al. | 228/188 |
| 6,783,867 | B2 * | 8/2004 | Sasaki et al. | 428/627 |
| 7,404,511 | B2 * | 7/2008 | Kimino, Kazunari | 228/11 |
| 2006/0290009 | A1 * | 12/2006 | Sugaya et al. | 257/780 |
| 2007/0183920 | A1 * | 8/2007 | Lu et al. | 419/9 |
| 2009/0072013 | A1 * | 3/2009 | Natekar et al. | 228/253 |

FOREIGN PATENT DOCUMENTS

JP 2006-49106 A 2/2006
WO WO 2006/126564 A1 * 11/2006

OTHER PUBLICATIONS

Derwent 2007-627992 (JP 2007-136563).*

* cited by examiner

*Primary Examiner*—Kiley Stoner
(74) *Attorney, Agent, or Firm*—Birch, Stewart, Kolasch & Birch, LLP

(57) ABSTRACT

Provided is a method of joining members having different thermal expansion coefficients, capable of joining them at a temperature lower than the melting point of Ag to obtain a joining layer having excellent durability to a thermal cycle. First Ag particles 3 having an average particle diameter of 50 nm or less and an Ag foil 4 or metal foil 4 having a smaller modulus of longitudinal elasticity than that of Ag are placed between two types of members 1 and 2 at least one of which has a lower thermal expansion coefficient than that of Ag, heated to join the members 1 and 2. A wax material 3, which is a powder mixture containing first Ag particles having an average particle diameter of 50 nm or less and second Ag particles or particles of a metal (having a modulus of longitudinal elasticity than that of Ag) having an average particle diameter of 20 μm or more and being contained in a volume fraction of 10 to 40% relative to a total volume of the powder mixture, is placed between the two types of members 1 and 2, heated to join the members 1 and 2. The metal foil 4 and the particles of a metal have an Ag coating layer on a surface thereof. The first member 1 is formed of one type of material selected from the group consisting of Si, SiC, $Al_2O_3$, AlN and $Si_3N_4$ and the second member is formed of Al or Cu.

18 Claims, 2 Drawing Sheets

METHOD OF JOINING MEMBERS HAVING DIFFERENT THERMAL EXPANSION COEFFICIENTS

BACKGROUND OF THE INVENTION

1. Field of the Invention

The present invention relates to a method of joining two types of members having different thermal expansion coefficients.

2. Description of the Related Art

In a conventional method of joining two types of members, it is known to join members, for example, different metals or a metal member and a ceramic member, with an Ag wax material.

When pure Ag is used as the Ag wax material, the Ag wax material is placed as a joining layer between the members to be joined. However, when the pure Ag is melted by heating to the melting point of Ag, Ag and other metals are reacted to form alloys, with the result that the joining layer becomes fragile. Then, to join the members at a temperature lower than the melting point of Ag, use of an Ag wax material containing Ag particles in the order of nanometers has been investigated.

As a composition containing the nanometer Ag particles, an Ag-powder mixture is known, which is formed by blending spherical-form Ag powder or flake-form Ag powder and rod-form Ag powder having a lengthwise diameter of not more than 10 μm and a crystallite diameter of not less than 30 nm (see Japanese Patent Application Laid-Open No. 2006-49106). The Ag-powder mixture is blended with a resin component and an organic solvent to prepare Ag paste, which is then used as a means for providing electrical conduction when a circuit such as a circuit of a print wiring substrate is formed.

When the Ag wax material containing nanometer Ag particles is placed between the members to be joined and used as a joining layer, even if the thermal expansion coefficients of the members are smaller than that of Ag, the members can be joined. However, since the joining layer is formed of pure Ag, the thermal expansion coefficient thereof is as large as 19.1 ppm/K. Thus, when the members whose thermal expansion coefficients are smaller than that of Ag are repeatedly subjected to a thermal cycle consisting of heating and cooling steps, the joining layer may not show sufficient durability to the thermal cycle because of the difference in thermal expansion coefficient between the joining layer and the members.

SUMMARY OF THE INVENTION

The present invention has been made under these circumstances. An object of the present invention is to provide a method of joining two types of members having different thermal expansion coefficients, at least one of which is smaller than that of Ag, at a temperature lower than the melting point of Ag.

Another object of the present invention is to provide a method of joining members having different thermal expansion coefficients, by which a joining layer having excellent durability to a thermal cycle consisting of heating and cooling steps, can be obtained.

To attain these objects, according to a first aspect of the invention, there is provided a method of joining two types of members having mutually different thermal expansion coefficients, at least one of which is smaller than that of Ag, comprising the steps of placing Ag particles having an average particle diameter of 50 nm or less and an Ag foil or a metal foil having a smaller modulus of longitudinal elasticity than that of Ag between the two types of members, and heating to join the two types of members.

In the method according to the first aspect of the invention, the Ag particles having an average particle diameter of 50 nm or less and an Ag foil or a metal foil having a smaller modulus of longitudinal elasticity than that of Ag are placed between the two types of members. Since the Ag particles used herein have an average particle diameter of 50 nm or less, they can form a joining layer with the Ag foil or the metal foil at a temperature lower than the melting point of Ag. Thus, the two types of members can be joined via the joining layer.

When the average particle diameter of the Ag particles is larger than 50 nm, they must be heated to a higher temperature. When the Ag particles are heated at the same temperature as in the Ag particles having an average particle diameter of 50 nm or less, the two members can be joined; however, the durability of them to a thermal cycle consisting of heating and cooling extremely decreases. Thus, the Ag particles preferably have an average particle diameter of 5 to 50 nm.

Furthermore, in the method according to the first aspect of the invention, the Ag particles and the Ag foil or the metal foil having a smaller modulus of longitudinal elasticity than that of Ag are placed between the two members and heated. Therefore, the rigidity of the joining layer thus formed can be reduced. Hence, according to the method of the first aspect of the invention, when the two members thus joined are exposed to a thermal cycle consisting of heating and cooling steps, they can absorb distortion to be produced by the thermal cycle and simultaneously suppress the stress to be generated. As a result, the members can acquire excellent durability to the thermal cycle.

The Ag foil or the metal foil preferably has a thickness of 20 to 200 μm. When the thickness of the Ag foil or the metal foil is less than 20 μm, sufficient durability to the thermal cycle consisting of heating and cooling steps cannot be obtained when the two members are jointed. On the other hand, when the thickness of the Ag foil or the metal foil exceeds 200 μm, a defect is easily formed in the bonded interface between the Ag foil or the metal foil and the Ag particles. The metal foil may have a plurality of throughholes uniformly formed therein.

To obtain further excellent durability to a thermal cycle consisting of heating and cooling steps, the metal foil preferably has a coating layer formed of Ag on a surface thereof. The coating layer may be formed by a method such as plating, vapor deposition or sputtering.

According to a second aspect of the invention, there is provided a method of joining two types of members having mutually different thermal expansion coefficients at least one of which is smaller than that of Ag, comprising the steps of placing a wax material, which is a powder mixture containing first Ag particles having an average particle diameter of 50 nm or less and second Ag particles or particles of a metal having a smaller modulus of longitudinal elasticity than that of Ag, between the two types of members, and heating to join the two types of members, the second Ag particles or particles of a metal having an average particle diameter of 20 μm or more and being contained in a volume fraction of 10 to 40% relative to a total volume of the powder mixture.

According to the method of the second aspect of the invention, the wax material is placed between the two members and heated. Since the wax material used herein contains the first Ag particles having an average particle diameter of 50 nm or less, the joining layer can be formed at a temperature lower than the melting point of Ag. Thus, the two members can be joined via the joining layer.

When the average particle diameter of the first Ag particles is larger than 50 nm, they must be heated to a higher temperature. When the first Ag particles are heated at the same temperature as in the Ag particles having an average particle diameter of 50 nm or less, the two members can be joined; however, the durability of them to a thermal cycle consisting of heating and cooling steps extremely decreases. Thus, the first Ag particles preferably have an average particle diameter within the range of 5 to 50 nm.

Furthermore, in the method according to the second aspect of the invention, the wax material is formed of a powder mixture containing the first Ag particles, and the second Ag particles or particles of a metal having a smaller modulus of longitudinal elasticity than that of Ag. The second Ag particles or the particles of a metal have an average particle diameter of 20 μm or more are contained in a volume fraction of 10 to 40% relative to the total volume of the powder mixture. Therefore, the rigidity of the joining layer formed by placing the wax material between two members, followed by heating can be reduced. Hence, according to the method of the second aspect of the invention, when the two members joined are exposed to a thermal cycle consisting of heating and cooling steps, they can absorb distortion to be produced by the thermal cycle and simultaneously suppress the stress to be generated. As a result, the members can acquire excellent durability to the thermal cycle.

When the average particle diameter of the second Ag particles or the particles of a metal having a smaller modulus of longitudinal elasticity than that of Ag is less than 20 μm or the volume fraction of them relative to the total volume of the powder mixture is outside the aforementioned range, the joining layer is formed with neither uniform texture nor sufficient durability to the thermal cycle consisting of heating and cooling steps. The second Ag particles or particles of a metal having a smaller modulus of longitudinal elasticity than that of Ag preferably have an average particle diameter within the range of 20 to 40 μm.

For the particles of a metal (metal particles) to obtain further excellent durability to a thermal cycle consisting of heating and cooling steps, the metal particles preferably have a coating layer formed of Ag on surfaces thereof. The coating layer may be formed by a method such as plating, vapor deposition or sputtering.

In the method of each aspect of the invention, a first member of the two types of members may be formed of one type of material selected from the group consisting of Si, SiC, $Al_2O_3$, AlN and $Si_3N_4$ and the second member may be formed of Al or Cu. The thermal expansion coefficients of Si, SiC and Cu are smaller than that (19.1 ppm/K) of Ag. In contrast, the thermal expansion coefficient of Al is larger than that of Ag. Examples of a member having a smaller thermal expansion coefficient include $Al_2O_3$, AlN and $Si_3N_4$, each of which can be joined with Al or Cu in accordance with the method of the invention.

In the method of the invention, as the particles of a metal having a smaller modulus of longitudinal elasticity than that of Ag, for example, Au particles may be mentioned.

DETAILED DESCRIPTION OF THE PREFERRED EMBODIMENTS

Figure 1:
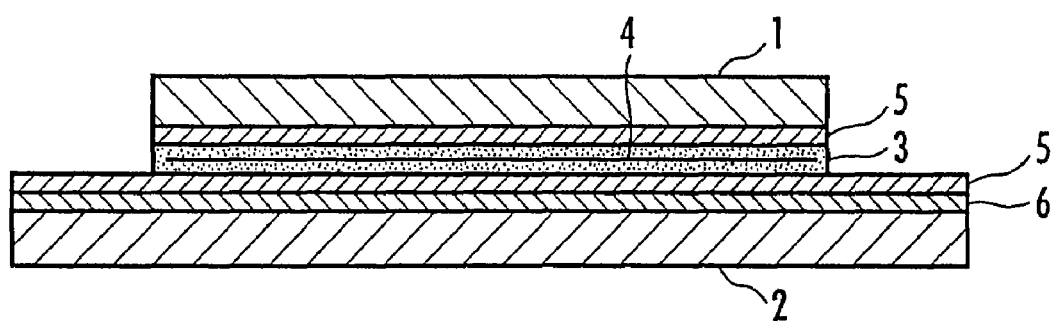
FIG. 1 is an explanatory cross-sectional view of a joining method according to the first aspect of the present invention.

The Embodiments of the present invention will be now explained more specifically referring to the accompanying drawings.

A joining method according to the first aspect of the present embodiment will be explained with reference to FIGS. 1 and 2. A wax material 3 is placed between two types of members 1 and 2 having mutually different thermal expansion coefficients, at least one of which is smaller than the thermal expansion coefficient of Ag. In the wax material 3, metal foil 4 is embedded. Subsequently, the members 1 and 2, between which the wax material 3 and the metal foil 4 embedded in the wax material 3 are arranged, are heated to a temperature lower than the melting point (960.8° C.) of Ag, for example, 380° C., and maintained at the temperature for 10 minutes. In this manner, the joining layer formed of the wax material 3 and the metal foil 4 is formed and the members 1 and 2 are joined via the joining layer. As a result, the joining layer having excellent durability to not less than 5000 thermal cycles, each consisting of a step of heating from room temperature to 180° C. and a step of cooling to reduce the temperature again to room temperature, performed in the air.

The member 1 to be joined may be formed of a material having a thermal expansion coefficient lower than that of Ag, such as Si, SiC, $Al_2O_3$, AlN and $Si_3N_4$. The thermal expansion coefficients of Si, SiC, $Al_2O_3$, AlN and $Si_3N_4$ are 2.8, 4.0, 7.5, 4.5 and 3.0 ppm/K, respectively, all of which are smaller than the thermal expansion coefficient (19.1 ppm/K) of Ag.

The member 2 to be joined may be formed of a material such as Al having a thermal expansion coefficient larger than that of Ag or a material such as Cu having a thermal expansion coefficient smaller than that of Ag. The thermal expansion coefficient of Al is 23.5 ppm/K and that of Cu is 17.0 ppm/K.

To improve the joining property between the member 1 and the joining layer formed of the wax material 3 and the metal foil 4 by heating, an Ag coating layer 5 is preferably provided onto a surface of the member 1. On the other hand, in the case of the member 2, which is formed of Al, it is preferable that an Ni plating layer 6 is provided onto a surface of the member 2, and then, the Ag coating layer 5 is provided onto the Ni plating layer 6, as shown in FIG. 1. In the case of the member 2, which is formed of Cu, no Ag coating layer 5 is provided on the surface of the member 2, as shown in FIG. 2. The Ag coating layer 5 can be formed by a method such as plating, vapor deposition, or sputtering.

The wax material 3 is formed of Ag particles having an average particle diameter within the range of 50 nm or less. The Ag particles preferably have an average particle diameter within the range of 5 to 50 nm.

The metal foil 4 is an Ag foil or metal foil having a smaller modulus of longitudinal elasticity (Young's modulus) than that of Ag. Examples of the metal foil having a smaller modulus of longitudinal elasticity than that of Ag may include an Al foil and an Au foil. The moduli of longitudinal elasticity of Al and Au are 70.6 GPa and 78.5 GPa, respectively, both of which are smaller than that (82.7 GPa) of Ag.

The metal foil 4 may have a number of throughholes uniformly arranged therein. For example, throughholes having a diameter of 100 μm are formed by machine work in the metal foil 4 such that they are arranged at intervals of 100 μm in terms of the distance from the outer circumference.

When the metal foil 4 is formed of a metal having a smaller modulus of longitudinal elasticity than that of Ag, preferably, an Ag coating layer may be provided on the surface of the metal foil 4. The Ag coating layer can be formed by a method such as plating, vapor deposition or sputtering.

A joining method according to the second aspect of the present invention will be explained with reference to FIGS. 3 and 4. The wax material 3 is placed between two types of members 1 and 2 having mutually different thermal expansion coefficients, at least one of which is smaller than the thermal expansion coefficient of Ag. Subsequently, the members 1 and 2 having the wax material 3 arranged therein are heated to a temperature lower than the melting point (960.8° C.) of Ag, for example, 380° C., and maintained at the temperature for 10 minutes. In this manner, the joining layer consisting of the wax material 3 is formed and the members 1 and 2 are joined via the joining layer. As a result, the joining layer having excellent durability to not less than 5000 thermal cycles, each consisting of a step of heating from room temperature to 180° C. and a step of cooling to reduce the temperature again to room temperature, performed in the air.

The members 1 and 2 that are entirely identical to those used in the method according to the first aspect may be used herein.

To improve the joining property between the member 1 and the joining layer formed of the wax material 3 and the metal foil 4 by heating, an Ag coating layer 5 is preferably provided onto a surface of the member 1. On the other hand, in the case of the member 2, which is formed of Al, preferably, an Ni plating layer 6 is provided onto a surface of the member 2, and then, the Ag coating layer 5 is provided onto the Ni plating layer 6, as shown in FIG. 3. Furthermore, in the case of the member 2, which is formed of Cu, no Ag coating layer 5 is formed on the surface of the member 2, as shown in FIG. 4. The Ag coating layer 5 can be formed by a method such as plating, vapor deposition, or sputtering.

The wax material 3 is a powder mixture containing Ag particles (first Ag particles), having an average particle diameter within the range of 50 nm or less, preferably within the range of 5 to 50 nm, and metal particles having an average particle diameter within the range of larger than 20 μm, preferably within the range of 20 to 40 μm. The metal particles used herein are Ag coarse particles (second Ag particles) having the aforementioned average particle size or metal coarse particles having the aforementioned average particle size and a smaller modulus of longitudinal elasticity than that of Ag. The wax material 3 contains the aforementioned Ag coarse particles or the metal coarse particles in a volume fraction within the range of 10 to 40% relative on the total volume of the powder mixture.

As an example of the metal coarse particles having a smaller modulus of longitudinal elasticity than that of Ag, Au coarse particles may be mentioned. The modulus of longitudinal elasticity of Au is the same as mentioned above. The metal coarse particles having a smaller modulus of longitudinal elasticity than that of Ag preferably have a coating layer formed of Ag on the surfaces thereof. The coating layer can be formed by a method such as plating, vapor deposition, or sputtering.

Next, Examples and Comparative Examples will be described below.

EXAMPLE 1

In this Example, Ag particles having an average particle diameter of 15 nm were prepared as the wax material 3. The Ag particles were coated with octadecanediol. The heat resistance temperature of the coating was about 220° C. Furthermore, an Ag foil having a thickness of 100 μm was prepared as the metal foil 4. Note that the modulus of longitudinal elasticity of Ag at room temperature is 82.7 GPa.

Subsequently, an Si chip of 10 mm×10 mm was prepared as the member 1 to be joined. The Si chip serving as the member 1 has the Ag coating layer 5 having a thickness of 50 nm and formed on a surface by vapor deposition, as shown in FIG. 1.

As the member 2 to be joined, an Al board of 20 mm×20 mm×5 mm was prepared. The Al board serving as the member 2 is formed of a material of Al050 board and has the Ni plating layer 6 on its surface, as shown in FIG. 1 and the Ag coating layer 5 of 120 nm in thickness is provided by vapor deposition on the Ni plating layer 6.

Note that the thermal expansion coefficient of Si is 2.8 ppm/K, which is smaller than that (19.1 ppm/K) of Ag. The thermal expansion coefficient of Al is 23.5 ppm/K, which is larger than that (19.1 ppm/K) of Ag.

As shown in FIG. 1, the wax material 3 was applied to the portion of 10 mm×10 mm between the Ag coating layer 5 of the member (Si chip) 1 and the Ag coating layer 5 of the member (Al board) 2, by use of a screen of 20 μm in thickness and simultaneously, metal foil 4 (an Ag foil of 100 μm in thickness) 4 was embedded in the wax material 3. The members 1 and 2 were superposed with the waxing material 3 and the metal foil 4 interposed therein. The resultant construct was heated at a temperature raising rate of 60° C./minute to 380° C. while applying a load of 2 MPa, and maintained at the temperature for 10 minutes. As a result, the joining layer formed of the waxing material 3 and the metal foil 4 was formed and the members 1 and 2 were joined via the joining layer.

Subsequently, the members 1 and 2 thus joined were subjected to a thermal cycle test in which each cycle consisting of a step of heating from room temperature to 180° C. and a step of cooling to reduce the temperature again to room temperature and performed in the air, was repeated up to 5000 times. In this way, durability to the thermal cycle was evaluated. The results are shown in Table 1.

EXAMPLE 2

In this Example, the member (Si chip) 1 and the member (Al board) 2 were joined in substantially the same manner as in Example 1 except that an Ag coating layer (not shown), which was formed by vapor deposition on the surface of an Al foil of 100 μm in thickness, was used as the metal foil 4 in place of the Ag foil used in Example 1. Note that the modulus of longitudinal elasticity of Al at room temperature is 70.6 GPa, which is smaller than that (82.7 GPa) of Ag.

The members 1 and 2 thus joined were then subjected to the thermal cycle test in substantially the same manner as in Example 1 to evaluate durability to the thermal cycle. The results are shown in Table 1.

EXAMPLE 3

In this Example, the member (Si chip) 1 and the member (Al board) 2 were joined in substantially the same manner as in Example 1 except that an Ag coating layer (not shown), which was formed by vapor deposition on the surface of an Au foil of 100 μm in thickness, was used as the metal foil 4 in place of the Ag foil used in Example 1. Note that the modulus of longitudinal elasticity of Au at room temperature is 78.5 GPa, which is smaller than that (82.7 GPa) of Ag.

The members 1 and 2 thus joined were then subjected to the thermal cycle test in substantially the same manner as in Example 1 to evaluate durability to the thermal cycle. The results are shown in Table 1.

COMPARATIVE EXAMPLE 1

In this Comparative Example, the member (Si chip) 1 and the member (Al board) 2 were joined in substantially the same manner as in Example 1 except that an Ag coating layer (not shown), which was formed by vapor deposition on the surface of foil of SUS 304 material (hereinafter, simply referred to as SUS foil) of 100 μm in thickness, was used as the metal foil 4 in place of the Ag foil used in Example 1. Note that the modulus of longitudinal elasticity of SUS 304 material is 199 GPa, which is larger than that (82.7 GPa) of Ag.

The members 1 and 2 thus joined were then subjected to the thermal cycle test in substantially the same manner as in Example 1 to evaluate durability to the thermal cycle. The results are shown in Table 1.

EXAMPLE 4

In this Example, the member (Si chip) 1 and the member (Al board) 2 were joined in substantially the same manner as in Example 1 except that an Ag foil having throughholes (not shown) of 100 μm in diameter formed by machine work such that they were arranged at intervals of 100 μm in the terms of distance from mutual outer circumferences thereof (hereinafter, the Ag foil having throughholes formed therein will be simply referred to as a porous Ag foil), was used as the metal foil 4 in place of the Ag foil used in Example 1; and the wax material 3 was applied by use of a screen of 200 μm in thickness.

The members 1 and 2 thus joined were then subjected to the thermal cycle test in substantially the same manner as in Example 1 to evaluate durability to the thermal cycle. The results are shown in Table 1.

EXAMPLE 5

In this Example, the member (Si chip) 1 and the member (Al board) 2 were joined in substantially the same manner as in Example 1 except that an Al foil of 100 μm in thickness having Ag coating layer (not shown) formed by vapor deposition on a surface thereof and having throughholes (not shown) of 100 μm in diameter formed by machine work such that they were arranged at intervals of 100 μm in the terms of distance from mutual outer circumferences thereof (hereinafter, the Al foil having throughholes formed therein will be simply referred to as a porous Al foil), was used as the metal foil 4 in place of the Ag foil used in Example 1; and the wax material 3 was applied by use of a screen of 200 μm in thickness.

The members 1 and 2 thus joined were then subjected to the thermal cycle test in substantially the same manner as in Example 1 to evaluate durability to the thermal cycle. The results are shown in Table 1.

EXAMPLE 6

In this Example, the member (Si chip) 1 and the member (Al board) 2 were joined in substantially the same manner as in Example 1 except that an Au foil of 100 μm in thickness having an Ag coating layer (not shown) formed by vapor deposition on a surface thereof and having throughholes (not shown) of 100 μm in diameter formed by machine work such that they were arranged at intervals of 100 μm in the terms of distance from mutual outer circumferences thereof (hereinafter the Au foil having throughholes formed therein will be simply referred to as a porous Au foil), was used as the metal foil 4 in place of the Ag foil used in Example 1; and the wax material 3 was applied by use of a screen of 200 μm in thickness.

The members 1 and 2 thus joined were then subjected to the thermal cycle test in substantially the same manner as in Example 1 to evaluate durability to the thermal cycle. The results are shown in Table 1.

COMPARATIVE EXAMPLE 2

In this Comparative Example, the member (Si chip) 1 and the member (Al board) 2 were joined in substantially the same manner as in Example 1 except that an SUS foil of 100 μm in thickness having an Ag coating layer (not shown) formed by vapor deposition on a surface thereof and having throughholes (not shown) of 100 μm in diameter formed by machine work such that they were arranged at intervals of 100 μm in the terms of distance from mutual outer circumferences thereof (hereinafter the SUS foil having throughholes formed therein will be simply referred to as a porous SUS foil), was used as the metal foil 4 in place of the Ag foil used in Example 1; and the wax material 3 was applied by use of a screen of 200 μm in thickness.

The members 1 and 2 thus joined were then subjected to the thermal cycle test in substantially the same manner as in Example 1 to evaluate durability to the thermal cycle. The results are shown in Table 1.

COMPARATIVE EXAMPLE 3

In this Comparative Example, the member (Si chip) 1 and the member (Al board) 2 were joined in substantially the same manner as in Example 1 except that no metal foil 4 was used and wax material 3 was solely applied by use of a screen of 20 μm in thickness.

The members 1 and 2 thus joined were then subjected to the thermal cycle test in substantially the same manner as in Example 1 to evaluate durability to the thermal cycle. The results are shown in Table 1.

COMPARATIVE EXAMPLE 4

In this Comparative Example, the member (Si chip) 1 and the member (Al board) 2 were joined in substantially the same manner as in Example 1 except that no metal foil 4 was used and the wax material 3 was solely applied by use of a screen of 50 μm in thickness.

The members 1 and 2 thus joined were then subjected to the thermal cycle test in substantially the same manner as in Example 1 to evaluate durability to the thermal cycle. The results are shown in Table 1.

COMPARATIVE EXAMPLE 5

In this Comparative Example, the member (Si chip) 1 and the member (Al board) 2 were joined in substantially the same manner as in Example 1 except that no metal foil 4 was used and the wax material 3 was solely applied by use of a screen of 100 μm in thickness.

The members 1 and 2 thus joined were then subjected to the thermal cycle test in substantially the same manner as in Example 1 to evaluate durability to the thermal cycle. The results are shown in Table 1.

COMPARATIVE EXAMPLE 6

In this Comparative Example, the member (Si chip) 1 and the member (Al board) 2 were joined in substantially the same manner as in Example 1 except that no metal foil 4 was used and the wax material 3 was solely applied by use of a screen of 200 μm in thickness.

The members 1 and 2 thus joined were then subjected to the thermal cycle test in substantially the same manner as in Example 1 to evaluate durability to the thermal cycle. The results are shown in Table 1.

TABLE 1

| | Average particle diameter of Ag particles(nm) | Material of metal foil | Thickness of joining layer (μm) | Number of duration cycles | Evaluation |
|---|---|---|---|---|---|
| Example 1 | 15 | Ag foil | 132 | 5000 or more | G |
| Example 2 | 15 | Al foil (with Ag coating) | 132 | 5000 or more | G |
| Example 3 | 15 | Au foil (with Ag coating) | 132 | 5000 or more | G |
| Comparative Example 1 | 15 | SUS foil (with Ag coating) | 133 | 800 | NG |
| Example 4 | 15 | Porous Ag foil | 130 | 5000 or more | G |
| Example 5 | 15 | Porous Al foil (with Ag coating) | 133 | 5000 or more | G |
| Example 6 | 15 | Porous Au foil (with Ag coating) | 132 | 5000 or more | G |
| Comparative Example 2 | 15 | Porous SUS foil (with Ag coating) | 131 | 750 | NG |
| Comparative Example 3 | 15 | None | 16 | 800 | NG |
| Comparative Example 4 | 15 | None | 45 | 1300 | NG |
| Comparative Example 5 | 15 | None | 80 | 2800 | NG |
| Comparative Example 6 | 15 | None | 130 | 2500 | NG |

Evaluation:
G: Number of duration cycles is 5000 or more
NG: Number of duration cycles is less than 5000

As is apparent from Table 1, according to the joining methods of Examples 1 to 6 in which Ag particles having an average particle diameter of 15 nm are used as the wax material 3 and an Ag foil, or an Al foil or an Au foil having a smaller modulus of longitudinal elasticity than that of Ag, is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 1 to 6, it is apparent that the Si chip serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining methods of Comparative Examples 1 and 2 in which an SUS foil having a larger modulus of longitudinal elasticity than that of Ag is used as the metal foil 4, the joining layer formed of the wax material 3 and the metal foil 4 exhibits durability to the thermal cycle of less than 5000 times. It is apparent that sufficient durability cannot be obtained.

Furthermore, according to the methods of Comparative Examples 3 to 6 in which no metal foil 4 is used and the wax material 3 formed of Ag particles having an average particle diameter of 15 nm is only used, the joining layer formed of the wax material 3 alone exhibits durability to the thermal cycle of less than 5000 times. It is apparent that sufficient durability cannot be obtained.

EXAMPLE 7

In this Example, the member (Si chip) 1 and the member (Al board) 2 were joined in substantially the same manner as in Example 1 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

EXAMPLE 8

In this Example, the member (Si chip) 1 and the member (Al board) 2 were joined in substantially the same manner as in Example 3 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

COMPARATIVE EXAMPLE 7

In this Comparative Example, the member (Si chip) 1 and the member (Al board) 2 were joined in substantially the same manner as in Comparative Example 1 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

EXAMPLE 9

In this Example, the member (Si chip) 1 and the member (Al board) 2 were joined in substantially the same manner as in Example 4 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

EXAMPLE 10

In this Example, the member (Si chip) 1 and the member (Al board) 2 were joined in substantially the same manner as in Example 6 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

COMPARATIVE EXAMPLE 8

In this Comparative Example, the member (Si chip) 1 and the member (Al board) 2 were joined in substantially the same manner as in Comparative Example 2 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

COMPARATIVE EXAMPLE 9

In this Comparative Example, the member (Si chip) 1 and the member (Al board) 2 were joined in substantially the same manner as in Comparative Example 3 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

COMPARATIVE EXAMPLE 10

In this Comparative Example, the member (Si chip) 1 and the member (Al board) 2 were joined in substantially the same manner as in Comparative Example 5 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

COMPARATIVE EXAMPLE 11

In this Comparative Example, the member (Si chip) 1 and the member (Al board) 2 were joined in substantially the same manner as in Comparative Example 6 except that Ag particles having an average particle diameter of 50 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 2.

TABLE 2

| | Average particle diameter of Ag particles (nm) | Material of metal foil | Thickness of joining layer (μm) | Number of duration cycles | Evaluation |
|---|---|---|---|---|---|
| Example 7 | 50 | Ag foil | 132 | 5000 or more | G |
| Example 8 | 50 | Au foil (with Ag coating) | 132 | 5000 or more | G |
| Comparative Example 7 | 50 | SUS foil (with Ag coating) | 133 | 800 | NG |
| Example 9 | 50 | Porous Ag foil | 130 | 5000 or more | G |
| Example 10 | 50 | Porous Au foil (with Ag coating) | 132 | 5000 or more | G |
| Comparative Example 8 | 50 | Porous SUS foil (with Ag coating) | 131 | 750 | NG |
| Comparative Example 9 | 50 | None | 16 | 800 | NG |
| Comparative Example 10 | 50 | None | 80 | 2800 | NG |
| Comparative Example 11 | 50 | None | 130 | 2500 | NG |

Evaluation:
G: Number of duration cycles is 5000 or more
NG: Number of duration cycles is less than 5000

As is apparent from Table 2, according to the joining methods of Examples 7 to 10 in which Ag particles having an average particle diameter of 50 nm are used as the wax material 3 and an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 7 to 10, it is apparent that the Si chip serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining methods of Comparative Examples 7 and 8 in which an SUS foil having a larger modulus of longitudinal elasticity than that of Ag is used as the metal foil 4, the joining layer formed of the wax material 3 and the metal foil 4 exhibits durability to the thermal cycle of less than 5000 times. It is apparent that sufficient durability cannot be obtained.

Furthermore, according to the methods of Comparative Examples 9 to 11 in which no metal foil 4 is used and the wax material 3 formed of Ag particles having an average particle diameter of 50 nm is solely used, the joining layer formed of the wax material 3 alone exhibits durability to the thermal cycle of less than 5000 times. It is apparent that sufficient durability cannot be obtained.

COMPARATIVE EXAMPLE 12

In this Comparative Example, the member (Si chip) 1 and the member (Al board) 2 were joined in substantially the same manner as in Example 1 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 13

In this Comparative Example, the member (Si chip) 1 and the member (Al board) 2 were joined in substantially the same manner as in Example 3 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 14

In this Comparative Example, the member (Si chip) 1 and the member (Al board) 2 were joined in substantially the same manner as in Comparative Example 1 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 15

In this Comparative Example, the member (Si chip) 1 and the member (Al board) 2 were joined in substantially the same manner as in Example 4 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 16

In this Comparative Example, the member (Si chip) 1 and the member (Al board) 2 were joined in substantially the same manner as in Example 6 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 17

In this Comparative Example, the member (Si chip) 1 and the member (Al board) 2 were joined in substantially the same manner as in Comparative Example 2 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 18

In this Comparative Example, the member (Si chip) 1 and the member (Al board) 2 were joined in substantially the same manner as in Comparative Example 3 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 19

In this Comparative Example, the member (Si chip) 1 and the member (Al board) 2 were joined in substantially the same manner as in Comparative Example 5 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

COMPARATIVE EXAMPLE 20

In this Comparative Example, the member (Si chip) 1 and the member (Al board) 2 were joined in substantially the same manner as in Comparative Example 6 except that Ag particles having an average particle diameter of 90 nm were used as the wax material 3 in place of the Ag particles having an average particle diameter of 15 nm used in Example 1.

The members 1 and 2 thus joined were then subjected to the thermal cycle test in substantially the same manner as in Example 1 to evaluate durability to the thermal cycle. The results are shown in Table 3.

TABLE 3

| | Average particle diameter of Ag particles (nm) | Material of metal foil | Thickness of joining layer (μm) | Number of duration cycles | Evaluation |
|---|---|---|---|---|---|
| Comparative Example 12 | 90 | Ag foil | 132 | 600 | NG |
| Comparative Example 13 | 90 | Au foil (with Ag coating) | 132 | 500 | NG |
| Comparative Example 14 | 90 | SUS foil (with Ag coating) | 133 | 800 | NG |
| Comparative Example 15 | 90 | Porous Ag foil | 130 | 600 | NG |
| Comparative Example 16 | 90 | Porous Au foil (with Ag coating) | 132 | 400 | NG |
| Comparative Example 17 | 90 | Porous SUS foil (with Ag coating) | 131 | 700 | NG |
| Comparative Example 18 | 90 | None | 16 | 800 | NG |
| Comparative Example 19 | 90 | None | 80 | 700 | NG |
| Comparative Example 20 | 90 | None | 130 | 500 | NG |

Evaluation:
G: Number of duration cycles is 5000 or more
NG: Number of duration cycles is less than 5000

As is apparent from Table 3, according to the joining methods of Comparative Examples 12 to 20 in which Ag particles having an average particle diameter of 90 nm, which is larger than the average particle diameter (50 nm) of Ag particles forming the wax material 3, the durability of the joining layer to thermal cycle is less than 1000 (cycles) at a heating temperature of 380° C. no matter which type of material the metal foil 4 is formed of and no matter whether the metal foil 4 is present or not. It is therefore apparent that sufficient durability cannot be obtained but extremely low durability is only obtained.

EXAMPLE 11

In this Example, the member (Si chip) 1 and the member (Al board) 2 were joined in substantially the same manner as in Example 1 except that the wax material 3 was prepared from a powder mixture containing Ag particles having an average particle diameter of 15 nm and Ag coarse particles having an average particle diameter of 20 μm in place of the wax material 3 solely formed of the Ag particles having an average particle diameter of 15 nm used in Example 1; no metal foil 4 was used; and the wax material 3 prepared in this Example was applied by use of a screen of 200 μm in thickness. In the wax material 3, the volume fraction of the Ag coarse particles relative to the total volume of the powder mixture was set at 20%.

Figure 3:
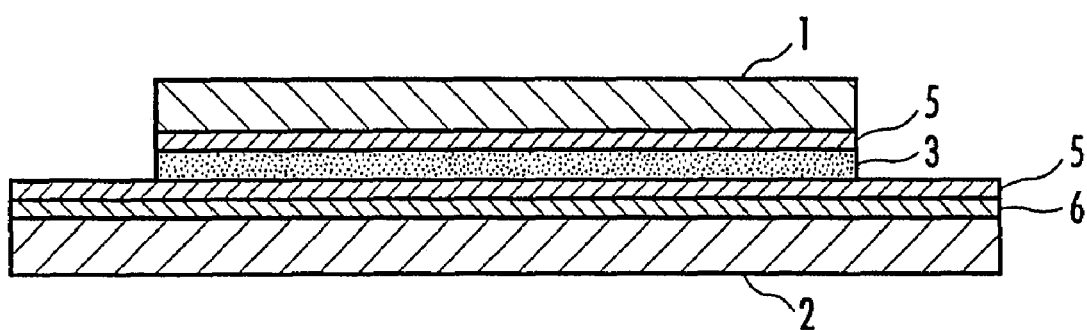
FIG. 3 is an explanatory cross-sectional view of a composite for explaining a joining method according to the second aspect of the present invention.

In this Example, as shown in FIG. 3, the wax material 3 prepared in this Example is solely placed between the Ag coating layer 5 of the member (Si chip) 1 and the Ag coating layer 5 of the member (Al board) 2, and no metal foil 4 is provided.

The members 1 and 2 thus joined were then subjected to the thermal cycle test in substantially the same manner as in Example 1 to evaluate durability to the thermal cycle. The results are shown in Table 4.

EXAMPLE 12

In this Example, the member (Si chip) 1 and the member (Al board) 2 were joined in substantially the same manner as in Example 11 except that the wax material 3 was prepared by use of Ag coarse particles having an average particle diameter of 30 μm in place of the Ag coarse particles having an average particle diameter of 20 μm used in Example 11.

The members 1 and 2 thus joined were then subjected to the thermal cycle test in substantially the same manner as in Example 1 to evaluate durability to the thermal cycle. The results are shown in Table 4.

EXAMPLE 13

In this Example, the member (Si chip) 1 and the member (Al board) 2 were joined in substantially the same manner as in Example 11 except that the wax material 3 was prepared by use of Ag coarse particles having an average particle diameter of 40 μm in place of the Ag coarse particles having an average particle diameter of 20 μm used in Example 11.

The members 1 and 2 thus joined were then subjected to the thermal cycle test in substantially the same manner as in Example 1 to evaluate durability to the thermal cycle. The results are shown in Table 4.

COMPARATIVE EXAMPLE 21

In this Comparative Example, the member (Si chip) 1 and the member (Al board) 2 were joined in substantially the same manner as in Example 11 except that the wax material 3 was prepared by use of Ag coarse particles having an average particle diameter of 10 μm in place of the Ag coarse particles having an average particle diameter of 20 μm used in Example 11.

The members 1 and 2 thus joined were then subjected to the thermal cycle test in substantially the same manner as in Example 1 to evaluate durability to the thermal cycle. The results are shown in Table 4.

EXAMPLE 14

In this Example, the member (Si chip) 1 and the member (Al board) 2 were joined in substantially the same manner as in Example 12 except that the wax material 3 was prepared by setting the volume fraction of the Ag coarse particles having an average particle diameter of 30 μm used in Example 12 relative to the total volume of the powder mixture containing the Ag particles and the Ag coarse particles at 10%.

The members 1 and 2 thus joined were then subjected to the thermal cycle test in substantially the same manner as in Example 1 to evaluate durability to the thermal cycle. The results are shown in Table 4.

EXAMPLE 15

In this Example, the member (Si chip) 1 and the member (Al board) 2 were joined in substantially the same manner as in Example 12 except that the wax material 3 was prepared by setting the volume fraction of the Ag coarse particles having an average particle diameter of 30 μm used in Example 12 relative to the total volume of the powder mixture containing the Ag particles and the Ag coarse particles at 30%.

The members 1 and 2 thus joined were then subjected to the thermal cycle test in substantially the same manner as in Example 1 to evaluate durability to the thermal cycle. The results are shown in Table 4.

EXAMPLE 16

In this Example, the member (Si chip) 1 and the member (Al board) 2 were joined in substantially the same manner as in Example 12 except that the wax material 3 was prepared by setting the volume fraction of the Ag coarse particles having an average particle diameter of 30 μm used in Example 12 relative to the total volume of the powder mixture containing the Ag particles and the Ag coarse particles at 40%.

The members 1 and 2 thus joined were then subjected to the thermal cycle test in substantially the same manner as in Example 1 to evaluate durability to the thermal cycle. The results are shown in Table 4.

COMPARATIVE EXAMPLE 22

In this Comparative Example, the member (Si chip) 1 and the member (Al board) 2 were joined in substantially the same manner as in Example 12 except that the wax material 3 was prepared by setting the volume fraction of the Ag coarse particles having an average particle diameter of 30 μm used in Example 12 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 4.

COMPARATIVE EXAMPLE 23

In this Comparative Example, the member (Si chip) 1 and the member (Al board) 2 were joined in substantially the same manner as in Example 12 except that the wax material 3 was prepared by setting the volume fraction of the Ag coarse particles having an average particle diameter of 30 μm used in Example 12 relative to the total volume of the powder mixture containing the Ag particles and the Ag coarse particles at 50%.

The members 1 and 2 thus joined were then subjected to the thermal cycle test in substantially the same manner as in Example 1 to evaluate durability to the thermal cycle. The results are shown in Table 4.

TABLE 4

| | Average particle diameter of Ag particles (nm) | Ag coarse particles | | Thickness of joining layer (μm) | Number of duration cycles | Evaluation |
| --- | --- | --- | --- | --- | --- | --- |
| | | Average particle diameter (μm) | Volume fraction (%) | | | |
| Example 11 | 15 | 20 | 20 | 127 | 5000 or more | G |
| Example 12 | 15 | 30 | 20 | 130 | 5000 or more | G |
| Example 13 | 15 | 40 | 20 | 129 | 5000 or more | G |
| Comparative Example 21 | 15 | 10 | 20 | 133 | 800 | NG |
| Example 14 | 15 | 30 | 10 | 127 | 5000 or more | G |
| Example 15 | 15 | 30 | 30 | 133 | 5000 or more | G |
| Example 16 | 15 | 30 | 40 | 128 | 5000 or more | G |
| Comparative Example 22 | 15 | 30 | 5 | 132 | 900 | NG |
| Comparative Example 23 | 15 | 30 | 50 | 130 | 900 | NG |

Evaluation:
G: Number of duration cycles is 5000 or more
NG: Number of duration cycles is less than 5000

As is apparent from Table 4, according to the joining methods of Examples 11 to 16 in which the average particle diameter of the Ag particles forming the wax material 3 is 15 nm, the average particle diameter of the Ag coarse particles falls within the range of 20 to 40 μm, and the volume fraction of the Ag coarse particles relative to the total volume of the powder mixture containing the Ag particles and the Ag coarse particles falls within the range of 10 to 40%, the joining layer formed of the wax material 3 can exhibit excellent durability to the thermal cycle of not less than 5000 times. Therefore, according to the joining methods of Examples 11 to 16, it is apparent that the Si chip serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 21 in which the average particle diameter of the Ag coarse particles forming the wax material 3 is smaller than 20 μm, that is, 10 μm, the joining method of Comparative Example 22 in which the volume fraction of the Ag coarse particles relative to the total volume of the powder mixture containing the Ag particles and Ag coarse particles is smaller than 10%, that is, 5%, and the joining method of Comparative Example 23 in which the volume fraction of the Ag coarse particles is larger than 40%, that is, 50%, the joining layer formed of the wax material 3 exhibits durability of less than 5000 thermal cycles. It is apparent that sufficient durability cannot be obtained.

EXAMPLE 17

In this Example, the member (Si chip) 1 and the member (Al board) 2 were joined in substantially the same manner as in Example 1 except that the wax material 3 was prepared from a powder mixture containing Ag particles having an average particle diameter of 15 nm and Au coarse particles having an average particle diameter of 20 μm in place of the wax material 3 solely formed of the Ag particles having an average particle diameter of 15 nm used in Example 1; no metal foil 4 was used; and the wax material 3 prepared in this Example was applied by use of a screen of 200 μm in thickness. The volume fraction of the Au coarse particles relative to the total volume of the powder mixture was set at 20%. Note that the modulus of longitudinal elasticity of Au at room temperature is 78.5 GPa, which is smaller than that (82.7 GPa) of Ag.

The members 1 and 2 thus joined were then subjected to the thermal cycle test in substantially the same manner as in Example 1 to evaluate durability to the thermal cycle. The results are shown in Table 5.

EXAMPLE 18

In this Example, the member (Si chip) 1 and the member (Al board) 2 were joined in substantially the same manner as in Example 17 except that the wax material 3 was prepared by use of Au coarse particles having an average particle diameter of 30 μm in place of the Au coarse particles having an average particle diameter of 20 μm used in Example 17.

The members 1 and 2 thus joined were then subjected to the thermal cycle test in substantially the same manner as in Example 1 to evaluate durability to the thermal cycle. The results are shown in Table 5.

COMPARATIVE EXAMPLE 24

In this Comparative Example, the member (Si chip) 1 and the member (Al board) 2 were joined in substantially the same manner as in Example 17 except that the wax material 3 was prepared by use of Au coarse particles having an average particle diameter of 10 μm in place of the Au coarse particles having an average particle diameter of 20 μm used in Example 17.

The members 1 and 2 thus joined were then subjected to the thermal cycle test in substantially the same manner as in Example 1 to evaluate durability to the thermal cycle. The results are shown in Table 5.

EXAMPLE 19

In this Example, the member (Si chip) 1 and the member (Al board) 2 were joined in substantially the same manner as in Example 18 except that the wax material 3 was prepared by setting the volume fraction of the Au coarse particles having an average particle diameter of 30 μm used in Example 18 relative to the total volume of the powder mixture containing the Ag particles and the Au coarse particles at 10%.

The members 1 and 2 thus joined were then subjected to the thermal cycle test in substantially the same manner as in Example 1 to evaluate durability to the thermal cycle. The results are shown in Table 5.

EXAMPLE 20

In this Example, the member (Si chip) 1 and the member (Al board) 2 were joined in substantially the same manner as in Example 18 except that the wax material 3 was prepared by setting the volume fraction of the Au coarse particles having an average particle diameter of 30 μm used in Example 18 relative to the total volume of the powder mixture containing the Ag particles and the Au coarse particles at 30%.

The members 1 and 2 thus joined were then subjected to the thermal cycle test in substantially the same manner as in Example 1 to evaluate durability to the thermal cycle. The results are shown in Table 5.

EXAMPLE 21

In this Example, the member (Si chip) 1 and the member (Al board) 2 were joined in substantially the same manner as in Example 18 except that the wax material 3 was prepared by setting the volume fraction of the Au coarse particles having an average particle diameter of 30 μm used in Example 18 relative to the total volume of the powder mixture containing the Ag particles and the Au coarse particles at 40%.

The members 1 and 2 thus joined were then subjected to the thermal cycle test in substantially the same manner as in Example 1 to evaluate durability to the thermal cycle. The results are shown in Table 5.

COMPARATIVE EXAMPLE 25

In this Comparative Example, the member (Si chip) 1 and the member (Al board) 2 were joined in substantially the same manner as in Example 18 except that the wax material 3 was prepared by setting the volume fraction of the Au coarse particles having an average particle diameter of 30 μm used in Example 18 relative to the total volume of the powder mixture containing the Ag particles and the Au coarse particles at 5%.

The members 1 and 2 thus joined were then subjected to the thermal cycle test in substantially the same manner as in Example 1 to evaluate durability to the thermal cycle. The results are shown in Table 5.

COMPARATIVE EXAMPLE 26

In this Comparative Example, the member (Si chip) 1 and the member (Al board) 2 were joined in substantially the same manner as in Example 18 except that the wax material 3 was prepared by setting the volume fraction of the Au coarse particles having an average particle diameter of 30 μm used in Example 18 relative to the total volume of the powder mixture containing the Ag particles and the Au coarse particles at 50%.

The members 1 and 2 thus joined were then subjected to the thermal cycle test in substantially the same manner as in Example 1 to evaluate durability to the thermal cycle. The results are shown in Table 5.

Comparative Example 25 in which the volume fraction of the Au coarse particles relative to the total volume of the powder mixture containing the Ag particles and Au coarse particles is smaller than 10%, that is, 5%, and the joining method of Comparative Example 26 in which the volume fraction of the Au coarse particles is larger than 40%, that is, 50%, the joining layer formed of the wax material 3 exhibits durability of less than 5000 thermal cycles. It is apparent that sufficient durability cannot be obtained.

COMPARATIVE EXAMPLE 27

In this Comparative Example, the member (Si chip) 1 and the member (Al board) 2 were joined in substantially the same manner as in Example 1 except that the wax material 3 was prepared from a powder mixture containing Ag particles having an average particle diameter of 15 nm and coarse particles of material SUS 304 (hereinafter, referred to as SUS coarse particles) having an average particle diameter of 10 μm in

TABLE 5

|  | Average particle diameter of Ag particles (nm) | Au coarse particles | | Thickness of joining layer (μm) | Number of duration cycles | Evaluation |
| --- | --- | --- | --- | --- | --- | --- |
|  |  | Average particle diameter (μm) | Volume fraction (%) |  |  |  |
| Example 17 | 15 | 20 | 20 | 130 | 5000 or more | G |
| Example 18 | 15 | 30 | 20 | 128 | 5000 or more | G |
| Comparative Example 24 | 15 | 10 | 20 | 131 | 900 | NG |
| Example 19 | 15 | 30 | 10 | 131 | 5000 or more | G |
| Example 20 | 15 | 30 | 30 | 130 | 5000 or more | G |
| Example 21 | 15 | 30 | 40 | 131 | 5000 or more | G |
| Comparative Example 25 | 15 | 30 | 5 | 133 | 800 | NG |
| Comparative Example 26 | 15 | 30 | 50 | 132 | 900 | NG |

Evaluation:
G: Number of duration cycles is 5000 or more
NG: Number of duration cycles is less than 5000

As is apparent from Table 5, according to the joining methods of Examples 17 to 21 in which the average particle diameter of the Ag particles forming the wax material 3 is 15 nm, the average particle diameter of the Au coarse particles having a smaller modulus of longitudinal elasticity than that of Ag falls within the range of 20 to 30 μm, and the volume fraction of the Au coarse particles relative to the total volume of the powder mixture containing the Ag particles and the Au coarse particles falls within the range of 10 to 40%, the joining layer formed of the wax material 3 can exhibit excellent durability to the thermal cycle of not less than 5000 times. Therefore, according to the joining methods of Examples 17 to 21, it is apparent that the Si chip serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 24 in which the average particle diameter of the Au coarse particles forming the wax material 3 is smaller than 20 μm, that is, 10 μm, the joining method of place of the wax material 3 solely formed of the Ag particles having an average particle diameter of 15 nm used in Example 1; no metal foil 4 was used; and the wax material 3 prepared in this Comparative Example was applied by use of a screen of 200 μm in thickness. The volume fraction of the SUS coarse particles relative to the total volume of the powder mixture was set at 20%. Note that the modulus of longitudinal elasticity of SUS at room temperature is 199 GPa, which is larger than that (82.7 GPa) of Ag.

The members 1 and 2 thus joined were then subjected to the thermal cycle test in substantially the same manner as in Example 1 to evaluate durability to the thermal cycle. The results are shown in Table 6.

COMPARATIVE EXAMPLE 28

In this Comparative Example, the member (Si chip) 1 and the member (Al board) 2 were joined in substantially the same manner as in Comparative Example 27 except that the wax material 3 was prepared by use of SUS coarse particles having an average particle diameter of 20 μm in place of the SUS coarse particles having an average particle diameter of 10 μm used in Comparative Example 27.

The members 1 and 2 thus joined were then subjected to the thermal cycle test in substantially the same manner as in Example 1 to evaluate durability to the thermal cycle. The results are shown in Table 6.

COMPARATIVE EXAMPLE 29

In this Comparative Example, the member (Si chip) 1 and the member (Al board) 2 were joined in substantially the same manner as in Comparative Example 27 except that the wax material 3 was prepared by use of SUS coarse particles having an average particle diameter of 30 μm in place of the SUS coarse particles having an average particle diameter of 10 μm used in Comparative Example 27.

The members 1 and 2 thus joined were then subjected to the thermal cycle test in substantially the same manner as in Example 1 to evaluate durability to the thermal cycle. The results are shown in Table 6.

COMPARATIVE EXAMPLE 30

In this Comparative Example, the member (Si chip) 1 and the member (Al board) 2 were joined in substantially the same manner as in Comparative Example 29 except that the wax material 3 was prepared by setting the volume fraction of the SUS coarse particles having an average particle diameter of 30 μm used in Comparative Example 29 relative to the total volume of the powder mixture containing the Ag particles and the SUS coarse particles at 5%.

The members 1 and 2 thus joined were then subjected to the thermal cycle test in substantially the same manner as in Example 1 to evaluate durability to the thermal cycle. The results are shown in Table 6.

COMPARATIVE EXAMPLE 31

In this Comparative Example, the member (Si chip) 1 and the member (Al board) 2 were joined in substantially the same manner as in Comparative Example 29 except that the wax material 3 was prepared by setting the volume fraction of the SUS coarse particles having an average particle diameter of 30 μm used in Comparative Example 29 relative to the total volume of the powder mixture containing the Ag particles and the SUS coarse particles at 10%.

The members 1 and 2 thus joined were then subjected to the thermal cycle test in substantially the same manner as in Example 1 to evaluate durability to the thermal cycle. The results are shown in Table 6.

COMPARATIVE EXAMPLE 32

In this Comparative Example, the member (Si chip) 1 and the member (Al board) 2 were joined in substantially the same manner as in Comparative Example 29 except that the wax material 3 was prepared by setting the volume fraction of the SUS coarse particles having an average particle diameter of 30 μm used in Comparative Example 29 relative to the total volume of the powder mixture containing the Ag particles and the SUS coarse particles at 30%.

The members 1 and 2 thus joined were then subjected to the thermal cycle test in substantially the same manner as in Example 1 to evaluate durability to the thermal cycle. The results are shown in Table 6.

COMPARATIVE EXAMPLE 33

In this Comparative Example, the member (Si chip) 1 and the member (Al board) 2 were joined in substantially the same manner as in Comparative Example 29 except that the wax material 3 was prepared by setting the volume fraction of the SUS coarse particles having an average particle diameter of 30 μm used in Comparative Example 29 relative to the total volume of the powder mixture containing the Ag particles and the SUS coarse particles at 40%.

The members 1 and 2 thus joined were then subjected to the thermal cycle test in substantially the same manner as in Example 1 to evaluate durability to the thermal cycle. The results are shown in Table 6.

COMPARATIVE EXAMPLE 34

In this Comparative Example, the member (Si chip) 1 and the member (Al board) 2 were joined in substantially the same manner as in Comparative Example 29 except that the wax material 3 was prepared by setting the volume fraction of the SUS coarse particles having an average particle diameter of 30 μm used in Comparative Example 29 relative to the total volume of the powder mixture containing the Ag particles and the SUS coarse particles at 50%.

The members 1 and 2 thus joined were then subjected to the thermal cycle test in substantially the same manner as in Example 1 to evaluate durability to the thermal cycle. The results are shown in Table 6.

TABLE 6

|  | Average particle diameter of Ag particles (nm) | SUS coarse particles | | Thickness of joining layer (μm) | Number of duration cycles | Evaluation |
| --- | --- | --- | --- | --- | --- | --- |
|  |  | Average particle diameter (μm) | Volume fraction (%) |  |  |  |
| Comparative Example 27 | 15 | 10 | 20 | 129 | 700 | NG |
| Comparative Example 28 | 15 | 20 | 20 | 128 | 700 | NG |

TABLE 6-continued

|  | Average particle diameter of Ag particles (nm) | SUS coarse particles | | Thickness of joining layer (μm) | Number of duration cycles | Evaluation |
|---|---|---|---|---|---|---|
|  |  | Average particle diameter (μm) | Volume fraction (%) |  |  |  |
| Comparative Example 29 | 15 | 30 | 20 | 133 | 700 | NG |
| Comparative Example 30 | 15 | 30 | 5 | 132 | 800 | NG |
| Comparative Example 31 | 15 | 30 | 10 | 128 | 700 | NG |
| Comparative Example 32 | 15 | 30 | 30 | 131 | 500 | NG |
| Comparative Example 33 | 15 | 30 | 40 | 130 | 400 | NG |
| Comparative Example 34 | 15 | 30 | 50 | 133 | 400 | NG |

Evaluation:
G: Number of duration cycles is 5000 or more
NG: Number of duration cycles is less than 5000

As is apparent from Table 6, according to the joining methods of Comparative Examples 27 to 34 in which the metal coarse particles forming the wax material 3 in combination with the Ag particles having an average particle diameter of 15 nm are SUS coarse particles having a larger modulus of longitudinal elasticity than that of Ag, durability of the joining layer formed of the wax material 3 is less than 1000 times, no matter which average particle diameter the SUS coarse particles have as well as no matter which volume fraction the SUS coarse particles have. It is apparent that sufficient durability cannot be obtained but extremely low durability is only obtained.

EXAMPLE 22

In this Example, the member (Si chip) 1 and the member (Cu board) 2 were joined in substantially the same manner as in Example 1 except that a Cu board was used as the member 2 in place of the Al board used in Example 1, and Ag particles having an average particle diameter of 50 nm were used as the wax material 3. In this Example, the same Ag foil as in Example 1 is used as the metal foil 4 to be embedded in the wax material 3 formed of Ag particles having an average particle diameter of 50 nm.

The Cu board serving as the member 2 is formed of material C1100. As shown in FIG. 2, the wax material 3 prepared in this Example is placed between the Ag coating layer 5 of the member (Si chip) 1 and the member (Cu board) 2. The metal foil (Ag foil) 4 is embedded in the wax material 3. The member (Cu board) 2 has no Ag coating layer 5 on the surface. Note that the thermal expansion coefficient of Si was 2.8 ppm/K and the thermal expansion coefficient of Cu was 17.0 ppm/K. Each of them is smaller than that (19.1 ppm/K) of Ag.

The members 1 and 2 thus joined were then subjected to the thermal cycle test in substantially the same manner as in Example 1 to evaluate durability to the thermal cycle. The results are shown in Table 7.

EXAMPLE 23

In this Example, the member (Si chip) 1 and the member (Cu board) 2 were joined in substantially the same manner as in Example 22 except that an Au foil of 100 μm in thickness having an Ag coating layer (not shown) formed on a surface thereof by vapor deposition was used as the metal foil 4 in place of the Ag foil used in Example 22.

The members 1 and 2 thus joined were then subjected to the thermal cycle test in substantially the same manner as in Example 1 to evaluate durability to the thermal cycle. The results are shown in Table 7.

COMPARATIVE EXAMPLE 35

In this Comparative Example, the member (Si chip) 1 and the member (Cu board) 2 were joined in substantially the same manner as in Example 22 except that an SUS foil of 100 μm in thickness having an Ag coating layer (not shown) formed on a surface thereof by vapor deposition was used as the metal foil 4 in place of the Ag foil used in Example 22.

The members 1 and 2 thus joined were then subjected to the thermal cycle test in substantially the same manner as in Example 1 to evaluate durability to the thermal cycle. The results are shown in Table 7.

COMPARATIVE EXAMPLE 36

In this Comparative Example, the member (Si chip) 1 and the member (Cu board) 2 were joined in substantially the same manner as in Example 22 except that no metal foil 4 was used and the wax material 3 was solely applied by use of a screen of 200 μm in thickness.

The members 1 and 2 thus joined were then subjected to the thermal cycle test in substantially the same manner as in Example 1 to evaluate durability to the thermal cycle. The results are shown in Table 7.

TABLE 7

| | Average particle diameter of Ag particles (nm) | Material of metal foil | Thickness of joining layer (μm) | Number of duration cycles | Evaluation |
|---|---|---|---|---|---|
| Example 22 | 50 | Ag foil | 134 | 5000 or more | G |
| Example 23 | 50 | Au foil (with Ag coating) | 138 | 5000 or more | G |
| Comparative Example 35 | 50 | SUS foil (with Ag coating) | 130 | 700 | NG |
| Comparative Example 36 | 50 | None | 126 | 2800 | NG |

Evaluation:
G: Number of duration cycles is 5000 or more
NG: Number of duration cycles is less than 5000

As is apparent from Table 7, according to the joining methods of Examples 22 and 23 in which the Ag particles having an average particle diameter of 50 nm are used as the wax material 3 and an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to thermal cycle of not less than 5000 times. Therefore, according to the joining methods of Examples 22 and 23, it is apparent that the Si chip serving as the member 1 and having a smaller thermal expansion coefficient than that of Ag and the Cu board serving as the member 2 can be joined by the joining layer without fail.

On the other hand, according to the joining method of Comparative Example 35 in which an SUS foil having a larger modulus of longitudinal elasticity than that of Ag is used as the metal foil 4, and Comparative Example 36 in which no metal foil 4 is used and the raw material 3 formed of Ag particles having an average particle diameter of 50 nm is solely used, the joining layer exhibits durability to the thermal cycle of less than 5000 times. It is apparent that sufficient durability cannot be obtained.

EXAMPLE 24

In this Example, the member (Si chip) 1 and the member (Cu board) 2 were joined in substantially the same manner as in Example 22 except that the wax material 3 was prepared from a powder mixture containing Ag particles having an average particle diameter of 50 nm and Ag coarse particles having an average particle diameter of 30 μm in place of the wax material 3 solely formed of the Ag particles having an average particle diameter of 50 nm used in Example 22; no metal foil 4 was used; and the wax material 3 prepared in this Example was applied by use of a screen of 200 μm in thickness. In the wax material 3, the volume fraction of the Ag coarse particles relative to the total volume of the powder mixture was set at 20%.

Figure 4:
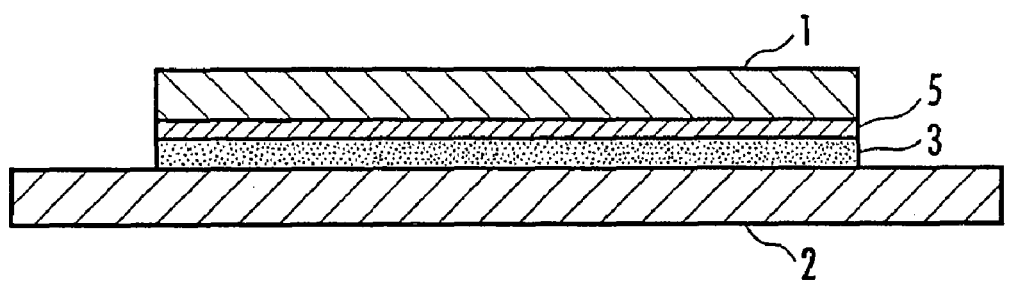
FIG. 4 is an explanatory cross-sectional view of a composite for explaining a joining method according to the third aspect of the present invention.

In this Example, as shown in FIG. 4, the wax material 3 prepared in this example is solely placed between the Ag coating layer 5 of the member (Si chip) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 8.

COMPARATIVE EXAMPLE 37

In this Comparative Example, the member (Si chip) 1 and the member (Cu board) 2 were joined in substantially the same manner as in Example 24 except that the wax material 3 was prepared by use of Ag coarse particles having an average particle diameter of 10 μm in place of the Ag coarse particles having an average particle diameter of 30 μm used in Example 24.

The members 1 and 2 thus joined were then subjected to the thermal cycle test in substantially the same manner as in Example 1 to evaluate durability to the thermal cycle. The results are shown in Table 8.

EXAMPLE 25

In this Example, the member (Si chip) 1 and the member (Cu board) 2 were joined in substantially the same manner as in Example 24 except that the wax material 3 was prepared by setting the volume fraction of the Ag coarse particles having an average particle diameter of 30 μm used in Example 24 relative to the total volume of the powder mixture containing the Ag particles and the Ag coarse particles at 10%.

The members 1 and 2 thus joined were then subjected to the thermal cycle test in substantially the same manner as in Example 1 to evaluate durability to the thermal cycle. The results are shown in Table 8.

COMPARATIVE EXAMPLE 38

In this Comparative Example, the member (Si chip) 1 and the member (Cu board) 2 were joined in substantially the same manner as in Example 24 except that the wax material 3 was prepared by setting the volume fraction of the Ag coarse particles having an average particle diameter of 30 μm used in Example 24 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 8.

TABLE 8

| | Average particle diameter of Ag particles (nm) | Ag coarse particles | | | Number of duration cycles | Evaluation |
| --- | --- | --- | --- | --- | --- | --- |
| | | Average particle diameter (μm) | Volume fraction (%) | Thickness of joining layer (μm) | | |
| Example 24 | 50 | 30 | 20 | 133 | 5000 or more | G |
| Comparative Example 37 | 50 | 10 | 20 | 127 | 900 | NG |
| Example 25 | 50 | 30 | 10 | 127 | 5000 or more | G |
| Comparative Example 38 | 50 | 30 | 5 | 139 | 1100 | NG |

Evaluation:
G: Number of duration cycles is 5000 or more
NG: Number of duration cycles is less than 5000

As is apparent from Table 8, according to the joining methods of Examples 24 and 25 in which the average particle diameter of the Ag particles forming the wax material 3 is 50 nm, the average particle diameter of the Ag coarse particles is 30 μm, and the volume fraction of the Ag coarse particles relative to the total volume of the powder mixture containing the Ag particles and the Ag coarse particles is 10 to 20%, the joining layer formed of the wax material 3 can exhibit excellent durability to the thermal cycle of not less than 5000 times. Therefore, according to the joining methods of Examples 24 and 25, it is apparent that the Si chip serving as the member 1 and having a smaller thermal expansion coefficient than that of Ag and the Cu board serving as the member 2 can be joined by the joining layer without fail.

On the other hand, according to the joining method of Comparative Example 37 in which the average particle diameter of the Ag coarse particles forming the wax material 3 is smaller than 20 μm, that is, 10 μm, and the joining method of Comparative Example 38 in which the volume fraction of the Ag coarse particles relative to the total volume of the powder mixture containing the Ag particles and Ag coarse particles is smaller than 10%, that is, 5%, the joining layer formed of the wax material 3 exhibits durability of less than 5000 thermal cycles. It is apparent that sufficient durability cannot be obtained.

EXAMPLE 26

In this Example, the member (Si chip) 1 and the member (Cu board) 2 were joined in substantially the same manner as in Example 22 except that the wax material 3 was prepared from a powder mixture containing Ag particles having an average particle diameter of 50 nm and Au coarse particles having an average particle diameter of 20 μm in place of the wax material 3 solely formed of the Ag particles having an average particle diameter of 50 nm used in Example 22; no metal foil 4 was used; and the wax material 3 prepared in this Example was applied by use of a screen of 200 μm in thickness. The volume fraction of the Au coarse particles relative to the total volume of the powder mixture was set at 20%.

In this Example, as shown in FIG. 4, the wax material 3 prepared in this example is solely placed between the Ag coating layer 5 of the member (Si chip) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 9.

COMPARATIVE EXAMPLE 39

In this Comparative Example, the member (Si chip) 1 and the member (Cu board) 2 were joined in substantially the same manner as in Example 26 except that the wax material 3 was prepared by use of Ag coarse particles having an average particle diameter of 10 μm in place of the Ag coarse particles having an average particle diameter of 20 μm used in Example 26.

The members 1 and 2 thus joined were then subjected to the thermal cycle test in substantially the same manner as in Example 1 to evaluate durability to the thermal cycle. The results are shown in Table 9.

EXAMPLE 27

In this Example, the member (Si chip) 1 and the member (Cu board) 2 were joined in substantially the same manner as in Example 26 except that the wax material 3 was prepared by use of Au coarse particles having an average particle diameter of 30 μm in place of the Au coarse particles having an average particle diameter of 20 μm used in Example 26, and by setting the volume fraction of the Au coarse particles relative to the total volume of the powder mixture containing the Ag particles and the Au coarse particles at 10%.

The members 1 and 2 thus joined were then subjected to the thermal cycle test in substantially the same manner as in Example 1 to evaluate durability to the thermal cycle. The results are shown in Table 9.

COMPARATIVE EXAMPLE 40

In this Comparative Example, the member (Si chip) 1 and the member (Cu board) 2 were joined in substantially the same manner as in Example 26 except that the wax material 3 was prepared by use of Au coarse particles having an average particle diameter of 30 μm in place of the Au coarse particles having an average particle diameter of 20 μm used in Example 26, and by setting the volume fraction of the Au coarse particles relative to the total volume of the powder mixture containing the Ag particles and the Au coarse particles at 5%.

The members 1 and 2 thus joined were then subjected to the thermal cycle test in substantially the same manner as in Example 1 to evaluate durability to the thermal cycle. The results are shown in Table 9.

TABLE 9

| | Average particle diameter of Ag particles (nm) | Au coarse particles Average particle diameter (μm) | Volume fraction (%) | Thickness of joining layer (μm) | Number of duration cycles | Evaluation |
|---|---|---|---|---|---|---|
| Example 26 | 50 | 20 | 20 | 125 | 5000 or more | G |
| Comparative Example 39 | 50 | 10 | 20 | 136 | 1200 | NG |
| Example 27 | 50 | 30 | 10 | 131 | 5000 or more | G |
| Comparative Example 40 | 50 | 30 | 5 | 138 | 1000 | NG |

Evaluation:
G: Number of duration cycles is 5000 or more
NG: Number of duration cycles is less than 5000

As is apparent from Table 9, according to the joining methods of Examples 26 and 27 in which the Ag particles forming the wax material 3 have an average particle diameter of 50 nm, the Au coarse particles have an average particle diameter of 20 to 30 μm, and the volume fraction of the Au coarse particles relative to the total volume of the powder mixture containing the Ag particles and the Au coarse particles is 10 to 20%, the joining layer formed of the wax material 3 can exhibit excellent durability to the thermal cycle of not less than 5000 times. Therefore, according to the joining methods of Examples 26 and 27, it is apparent that the Si chip serving as the member 1 and having a smaller thermal expansion coefficient than that of Ag and the Cu board serving as the member 2 can be joined by the joining layer without fail.

On the other hand, according to the joining method of Comparative Example 39 in which the average particle diameter of the Au coarse particles forming the wax material 3 is smaller than 20 μm, that is, 10 μm, and the joining method of Comparative Example 40 in which the volume fraction of the Au coarse particles relative to the total volume of the powder mixture containing the Ag particles and Au coarse particles is smaller than 10%, that is, 5%, the joining layer formed of the wax material 3 exhibits durability of less than 5000 thermal cycles. It is apparent that sufficient durability cannot be obtained.

EXAMPLE 28

In this Example, the member (SiC chip) 1 and the member (Cu board) 2 were joined in substantially the same manner as in Example 1 except that an SiC chip was used as the member 1 in place of the Si chip used in Example 1, Cu board was used as the member 2 in place of the Al board used in Example 1, and Ag particles having an average particle diameter of 50 nm were used as the wax material 3. In this Example, the same Ag foil as used in Example 1 was used as the metal foil 4 to be embedded in the wax material 3 formed of the Ag particles having an average particle diameter of 50 nm.

Figure 2:
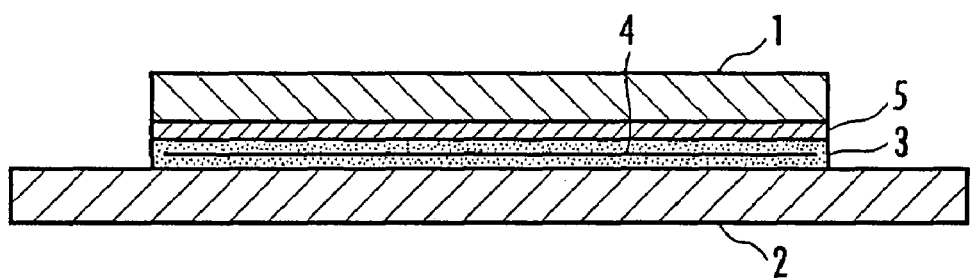
FIG. 2 is an explanatory cross-sectional view of a joining method according to the first aspect of the present invention.

The SiC chip serving as the member 1 has an Ag coating layer 5 on a surface thereof as shown in FIG. 2. The structure of the Cu board serving as the member 2 is substantially the same as in Example 22.

In this Example, as shown in FIG. 2, the wax material 3 prepared in this Example is placed between the Ag coating layer 5 of the member (SiC chip) 1 and the member (Cu board) 2, and the metal foil (Ag foil) 4 is embedded in the wax material 3. Note that the thermal expansion coefficient of SiC was 4.0 ppm/K and the thermal expansion coefficient of Cu was 17.0 ppm/K. Each of them is smaller than that (19.1 ppm/K) of Ag.

The members 1 and 2 thus joined were then subjected to the thermal cycle test in substantially the same manner as in Example 1 to evaluate durability to the thermal cycle. The results are shown in Table 10.

EXAMPLE 29

In this Example, the member (SiC chip) 1 and the member (Cu board) 2 were joined in substantially the same manner as in Example 28 except that an Au foil of 100 μm in thickness having an Ag coating layer (not shown) formed on a surface thereof by vapor deposition was used as the metal foil 4 in place of the Ag foil used in Example 28.

The members 1 and 2 thus joined were then subjected to the thermal cycle test in substantially the same manner as in Example 1 to evaluate durability to the thermal cycle. The results are shown in Table 10.

COMPARATIVE EXAMPLE 41

In this Comparative Example, the member (SiC chip) 1 and the member (Cu board) 2 were joined in substantially the same manner as in Example 28 except that an SUS foil of 100 μm in thickness having an Ag coating layer (not shown) formed on a surface thereof by vapor deposition was used as the metal foil 4 in place of the Ag foil used in Example 28.

The members 1 and 2 thus joined were then subjected to the thermal cycle test in substantially the same manner as in Example 1 to evaluate durability to the thermal cycle. The results are shown in Table 10.

COMPARATIVE EXAMPLE 42

In this Comparative Example, the member (SiC chip) 1 and the member (Cu board) 2 were joined in substantially the same manner as in Example 28 except that no metal foil 4 was used and the wax material 3 was solely applied by use of a screen of 200 μm in thickness.

The members 1 and 2 thus joined were then subjected to the thermal cycle test in substantially the same manner as in Example 1 to evaluate durability to the thermal cycle. The results are shown in Table 10.

TABLE 10

| | Average particle diameter of Ag particles (nm) | Material of metal foil | Thickness of joining layer (μm) | Number of duration cycles | Evaluation |
|---|---|---|---|---|---|
| Example 28 | 50 | Ag foil | 138 | 5000 or more | G |
| Example 29 | 50 | Au foil (with Ag coating) | 138 | 5000 or more | G |
| Comparative Example 41 | 50 | SUS foil (with Ag coating) | 133 | 600 | NG |
| Comparative Example 42 | 50 | None | 120 | 2600 | NG |

Evaluation:
G: Number of duration cycles is 5000 or more
NG: Number of duration cycles is less than 5000

As is apparent from Table 10, according to the joining methods of Examples 28 and 29 in which Ag particles having an average particle diameter of 50 nm are used as the wax material 3 and an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 28 and 29, it is apparent that the SiC chip serving as the member 1 and having a smaller thermal expansion coefficient than that of Ag and the Cu board serving as the member 2 can be joined by the joining layer without fail.

On the other hand, according to the joining method of Comparative Example 41 in which an SUS foil having a larger modulus of longitudinal elasticity than that of Ag is used as the metal foil 4, and the joining method of Comparative Example 42 in which no metal foil 4 is used and the wax material 3 formed of the Ag particles having an average particle diameter of 50 nm is solely used, the joining layer exhibits durability to the thermal cycle of less than 5000 times. It is apparent that sufficient durability cannot be obtained.

EXAMPLE 30

In this Example, the member (SiC chip) 1 and the member (Cu board) 2 were joined in substantially the same manner as in Example 28 except that the wax material 3 was prepared from a powder mixture containing Ag particles having an average particle diameter of 50 nm and Ag coarse particles having an average particle diameter of 30 μm in place of the wax material 3 solely formed of the Ag particles having an average particle diameter of 50 nm used in Example 28; no metal foil 4 was used; and the wax material 3 prepared in this Example was applied by use of a screen of 200 μm in thickness. In the wax material 3, the volume fraction of the Ag coarse particles relative to the total volume of the powder mixture was set at 20%.

In this Example, as shown in FIG. 4, the wax material 3 prepared in this Example is solely placed between the Ag coating layer 5 of the member (SiC chip) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 11.

COMPARATIVE EXAMPLE 43

In this Comparative Example, the member (SiC chip) 1 and the member (Cu board) 2 were joined in substantially the same manner as in Example 30 except that the wax material 3 was prepared by use of Ag coarse particles having an average particle diameter of 10 μm in place of the Ag coarse particles having an average particle diameter of 30 μm used in Example 30.

The members 1 and 2 thus joined were then subjected to the thermal cycle test in substantially the same manner as in Example 1 to evaluate durability to the thermal cycle. The results are shown in Table 11.

EXAMPLE 31

In this Example, the member (SiC chip) 1 and the member (Cu board) 2 were joined in substantially the same manner as in Example 30 except that the wax material 3 was prepared by setting the volume fraction of the Ag coarse particles having an average particle diameter of 30 μm used in Example 30 relative to the total volume of the powder mixture containing the Ag particles and the Ag coarse particles at 10%.

The members 1 and 2 thus joined were then subjected to the thermal cycle test in substantially the same manner as in Example 1 to evaluate durability to the thermal cycle. The results are shown in Table 11.

COMPARATIVE EXAMPLE 44

In this Comparative Example, the member (SiC chip) 1 and the member (Cu board) 2 were joined in substantially the same manner as in Example 30 except that the wax material 3 was prepared by setting the volume fraction of the Ag coarse particles having an average particle diameter of 30 μm used in Example 30 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 11.

TABLE 11

| | Average particle diameter of Ag particles (nm) | Ag coarse particles | | Thickness of joining layer (μm) | Number of duration cycles | Evaluation |
| --- | --- | --- | --- | --- | --- | --- |
| | | Average particle diameter (μm) | Volume fraction (%) | | | |
| Example 30 | 50 | 30 | 20 | 138 | 5000 or more | G |
| Comparative Example 43 | 50 | 10 | 20 | 127 | 800 | NG |
| Example 31 | 50 | 30 | 10 | 129 | 5000 or more | G |
| Comparative Example 44 | 50 | 30 | 5 | 122 | 1300 | NG |

Evaluation:
G: Number of duration cycles is 5000 or more
NG: Number of duration cycles is less than 5000

As is apparent from Table 11, according to the joining methods of Examples 30 and 31 in which the average particle diameter of the Ag particles forming the wax material 3 is 50 nm, the average particle diameter of the Ag coarse particles is 30 μm, and the volume fraction of the Ag coarse particles relative to the total volume of the powder mixture containing the Ag particles and the Ag coarse particles is 10 to 20%, the joining layer formed of the wax material 3 can exhibit excellent durability to the thermal cycle of not less than 5000 times. Therefore, according to the joining methods of Examples 30 and 31, it is apparent that the SiC chip serving as the member 1 and having a smaller thermal expansion coefficient than that of Ag and the Cu board serving as the member 2 can be joined by the joining layer without fail.

On the other hand, according to the joining method of Comparative Example 43 in which the average particle diameter of the Ag coarse particles forming the wax material 3 is smaller than 20 μm, that is, 10 μm, and the joining method of Comparative Example 44 in which the volume fraction of the Ag coarse particles relative to the total volume of the powder mixture containing the Ag particles and Ag coarse particles is smaller than 10%, that is, 5%, the joining layer formed of the wax material 3 exhibits durability of less than 5000 thermal cycles. It is apparent that sufficient durability cannot be obtained.

EXAMPLE 32

In this Example, the member (SiC chip) 1 and the member (Cu board) 2 were joined in substantially the same manner as in Example 30 except that the wax material 3 was prepared from a powder mixture containing Ag particles having an average particle diameter of 50 nm and Au coarse particles having an average particle diameter of 20 μm in place of the wax material 3 solely formed of the Ag particles having an average particle diameter of 50 nm used in Example 30; no metal foil 4 was used; and the wax material 3 prepared in this Example was applied by use of a screen of 200 μm in thickness. In the wax material 3, the volume fraction of the Au coarse particles relative to the total volume of the powder mixture was set at 20%.

In this Example, as shown in FIG. 4, the wax material 3 prepared in this Example is solely placed between the Ag coating layer 5 of the member (SiC chip) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 12.

COMPARATIVE EXAMPLE 45

In this Comparative Example, the member (SiC chip) 1 and the member (Cu board) 2 were joined in substantially the same manner as in Example 32 except that the wax material 3 was prepared by use of Au coarse particles having an average particle diameter of 10 μm in place of the Au coarse particles having an average particle diameter of 20 μm used in Example 32.

The members 1 and 2 thus joined were then subjected to the thermal cycle test in substantially the same manner as in Example 1 to evaluate durability to the thermal cycle. The results are shown in Table 12.

EXAMPLE 33

In this Example, the member (SiC chip) 1 and the member (Cu board) 2 were joined in substantially the same manner as in Example 32 except that the wax material 3 was prepared by use of Au coarse particles having an average particle diameter of 30 μm in place of the Au coarse particles having an average particle diameter of 20 μm used in Example 32 and by setting the volume fraction of the Au coarse particles relative to the total volume of the powder mixture containing the Ag particles and Au coarse particles at 10%.

The members 1 and 2 thus joined were then subjected to the thermal cycle test in substantially the same manner as in Example 1 to evaluate durability to the thermal cycle. The results are shown in Table 12.

COMPARATIVE EXAMPLE 46

In this Comparative Example, the member (SiC chip) 1 and the member (Cu board) 2 were joined in substantially the same manner as in Example 32 except that the wax material 3 was prepared by use of Au coarse particles having an average particle diameter of 30 μm in place of the Ag coarse particles having an average particle diameter of 20 μm used in Example 32, and by setting the volume fraction of the Au coarse particles relative to the total volume of the powder mixture containing the Ag particles and Au coarse particles at 5%.

The members 1 and 2 thus joined were then subjected to the thermal cycle test in substantially the same manner as in Example 1 to evaluate durability to the thermal cycle. The results are shown in Table 12.

TABLE 12

| | Average particle diameter of Ag particles (nm) | Au coarse particles | | Thickness of joining layer (μm) | Number of duration cycles | Evaluation |
|---|---|---|---|---|---|---|
| | | Average particle diameter (μm) | Volume fraction (%) | | | |
| Example 32 | 50 | 20 | 20 | 129 | 5000 or more | G |
| Comparative Example 45 | 50 | 10 | 20 | 135 | 1400 | NG |
| Example 33 | 50 | 30 | 10 | 121 | 5000 or more | G |
| Comparative Example 46 | 50 | 30 | 5 | 138 | 1200 | NG |

Evaluation:
G: Number of duration cycles is 5000 or more
NG: Number of duration cycles is less than 5000

As is apparent from Table 12, according to the joining methods of Examples 32 and 33 in which the average particle diameter of the Ag particles forming the wax material 3 is 50 nm, the average particle diameter of the Au coarse particles is 20 to 30 μm, and the volume fraction of the Au coarse particles relative to the total volume of the powder mixture containing the Ag particles and the Au coarse particles is 10 to 20%, the joining layer formed of the wax material 3 can exhibit excellent durability to the thermal cycle of not less than 5000 times. Therefore, according to the joining methods of Examples 32 and 33, it is apparent that the SiC chip serving as the member 1 and having a smaller thermal expansion coefficient than that of Ag and the Cu board serving as the member 2 can be joined by the joining layer without fail.

On the other hand, according to the joining method of Comparative Example 45 in which the average particle diameter of the Au coarse particles forming the wax material 3 is smaller than 20 μm, that is, 10 μm, and the joining method of Comparative Example 46 in which the volume fraction of the Au coarse particles relative to the total volume of the powder mixture containing the Ag particles and Au coarse particles is smaller than 10%, that is, 5%, the joining layer formed of the wax material 3 exhibits durability of less than 5000 thermal cycles. It is apparent that sufficient durability cannot be obtained.

EXAMPLE 34

In this Example, the member ($Al_2O_3$ board) 1 and the member (Cu board) 2 were joined in substantially the same manner as in Example 1 except that an $Al_2O_3$ board of 10 mm×10 mm×0.6 mm was used as the member 1 in place of the Si chip used in Example 1; a Cu board was used as the member 2 in place of the Al board used in Example 1, and Ag particles having an average particle diameter of 50 nm were used as the wax material 3. In this Example, the same Ag foil as in Example 1 is used as the metal foil 4 to be embedded in the wax material 3 formed of Ag particles having an average particle diameter of 50 nm.

The $Al_2O_3$ board serving as the member 1 has the Ag coating layer 5 on a surface thereof, as shown in FIG. 2. The structure of the Cu board serving as the member 2 is substantially the same as in Example 22.

In this Example, as shown in FIG. 2, the wax material 3 prepared in this Example is placed between the Ag coating layer 5 of the member ($Al_2O_3$ board) 1 and the member (Cu board) 2, and the metal foil (Ag foil) 4 is embedded in the wax material 3. Note that the thermal expansion coefficient of $Al_2O_3$ is 7.5 ppm/K, and the thermal expansion coefficient of Cu is 17.0 ppm/K, both of which are smaller than that (19.1 ppm/K) of Ag.

The members 1 and 2 thus joined were then subjected to the thermal cycle test in substantially the same manner as in Example 1 to evaluate durability to the thermal cycle. The results are shown in Table 13.

EXAMPLE 35

In this Example, the member ($Al_2O_3$ board) 1 and the member (Cu board) 2 were joined in substantially the same manner as in Example 34 except that an Au foil of 100 μm in thickness having an Ag coating layer (not shown) formed on a surface thereof by vapor deposition was used as the metal foil 4 in place of the Ag foil used in Example 34.

The members 1 and 2 thus joined were then subjected to the thermal cycle test in substantially the same manner as in Example 1 to evaluate durability to the thermal cycle. The results are shown in Table 13.

COMPARATIVE EXAMPLE 47

In this Comparative Example, the member ($Al_2O_3$ board) 1 and the member (Cu board) 2 were joined in substantially the same manner as in Example 34 except that an SUS foil of 100 μm in thickness having an Ag coating layer (not shown) formed on a surface thereof by vapor deposition was used as the metal foil 4 in place of the Ag foil used in Example 34.

The members 1 and 2 thus joined were then subjected to the thermal cycle test in substantially the same manner as in Example 1 to evaluate durability to the thermal cycle. The results are shown in Table 13.

COMPARATIVE EXAMPLE 48

In this Comparative Example, the member ($Al_2O_3$ board) 1 and the member (Cu board) 2 were joined in substantially the same manner as in Example 34 except that no metal foil 4 was used and the wax material 3 was applied by use of a screen of 200 μm in thickness.

The members 1 and 2 thus joined were then subjected to the thermal cycle test in substantially the same manner as in Example 1 to evaluate durability to the thermal cycle. The results are shown in Table 13.

TABLE 13

| | Average particle diameter of Ag particles (nm) | Material of metal foil | Thickness of joining layer (μm) | Number of duration cycles | Evaluation |
|---|---|---|---|---|---|
| Example 34 | 50 | Ag foil | 134 | 5000 or more | G |
| Example 35 | 50 | Au foil (with Ag coating) | 130 | 5000 or more | G |
| Comparative Example 47 | 50 | SUS foil (with Ag coating) | 139 | 700 | NG |
| Comparative Example 48 | 50 | None | 124 | 2400 | NG |

Evaluation:
G: Number of duration cycles is 5000 or more
NG: Number of duration cycles is less than 5000

As is apparent from Table 13, according to the joining methods of Examples 34 and 35 in which the Ag particles having the average particle diameter of 50 nm are used as the wax material 3, an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 34 and 35, it is apparent that the $Al_2O_3$ board serving as the member 1 and having a smaller thermal expansion coefficient than that of Ag and the Cu board serving as the member 2 can be joined by the joining layer without fail.

On the other hand, according to the joining method of Comparative Example 47 in which an SUS foil having a larger modulus of longitudinal elasticity than that of Ag is used as the metal foil 4, and the joining method of Comparative Example 48 in which no metal foil 4 is used and the wax material 3 formed of the Ag particles having an average particle diameter of 50 nm is solely used, the joining layer exhibits durability to the thermal cycle of less than 5000 times. It is apparent that sufficient durability cannot be obtained.

EXAMPLE 36

In this Example, the member ($Al_2O_3$ board) 1 and the member (Cu board) 2 were joined in substantially the same manner as in Example 34 except that the wax material 3 was prepared from a powder mixture containing Ag particles having an average particle diameter of 50 nm and Ag coarse particles having an average particle diameter of 30 μm in place of the wax material 3 solely formed of the Ag particles having an average particle diameter of 50 nm used in Example 34; no metal foil 4 was used; and the wax material 3 prepared in this Example was applied by use of a screen of 200 μm in thickness. In the wax material 3, the volume fraction of the Ag coarse particles relative to the total volume of the powder mixture was set at 10%.

In this Example, as shown in FIG. 4, the wax material 3 prepared in this Example is solely placed between the Ag coating layer 5 of the member ($Al_2O_3$ board) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 14.

COMPARATIVE EXAMPLE 49

In this Comparative Example, the member ($Al_2O_3$ board) 1 and the member (Cu board) 2 were joined in substantially the same manner as in Example 36 except that the wax material 3 was prepared by setting the volume fraction of the Ag coarse particles having an average particle diameter of 30 μm used in Example 36 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 14.

TABLE 14

| | Average particle diameter of Ag particles (nm) | Ag coarse particles | | Thickness of joining layer (μm) | Number of duration cycles | Evaluation |
|---|---|---|---|---|---|---|
| | | Average particle diameter (μm) | Volume fraction (%) | | | |
| Example 36 | 50 | 30 | 10 | 139 | 5000 or more | G |
| Comparative Example 49 | 50 | 30 | 5 | 132 | 1200 | NG |

Evaluation:
G: Number of duration cycles is 5000 or more
NG: Number of duration cycles is less than 5000

As is apparent from Table 14, according to the joining method of Example 36 in which the average particle diameter of the Ag particles forming the wax material 3 is 50 nm, the average particle diameter of the Ag coarse particles is 30 μm, and the volume fraction of the Ag coarse particles relative to the total volume of the powder mixture containing the Ag particles and the Ag coarse particles is 10%, the joining layer formed of the wax material 3 can exhibit excellent durability to the thermal cycle of not less than 5000 times. Therefore, according to the joining method of Example 36, it is apparent that the $Al_2O_3$ board serving as the member 1 and having a smaller thermal expansion coefficient than that of Ag and the Cu board serving as the member 2 can be joined by the joining layer without fail.

On the other hand, according to the joining method of Comparative Example 49 in which the volume fraction of the Ag coarse particles relative to the total volume of the powder mixture containing the Ag particles and Ag coarse particles is smaller than 10%, that is, 5%, the joining layer formed of the wax material 3 exhibits durability of less than 5000 thermal cycles. It is apparent that sufficient durability cannot be obtained.

EXAMPLE 37

In this Example, the member ($Al_2O_3$ board) 1 and the member (Cu board) 2 were joined in substantially the same manner as in Example 34 except that the wax material 3 was prepared from a powder mixture containing Ag particles having an average particle diameter of 50 nm and Au coarse particles having an average particle diameter of 20 μm in place of the wax material 3 solely formed of the Ag particles having an average particle diameter of 50 nm used in Example 34; no metal foil 4 was used; and the wax material 3 prepared in this Example was applied by use of a screen of 200 μm in thickness. In the wax material 3, the volume fraction of the Au coarse particles relative to the total volume of the powder mixture was set at 20%.

In this Example, as shown in FIG. 4, the wax material 3 prepared in this Example is solely placed between the Ag coating layer 5 of the member ($Al_2O_3$ board) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 15.

COMPARATIVE EXAMPLE 50

In this Comparative Example, the member ($Al_2O_3$ board) 1 and the member (Cu board) 2 were joined in substantially the same manner as in Example 37 except that the wax material 3 was prepared by Au coarse particles having an average particle diameter of 10 μm in place of the Au coarse particles having an average particle diameter of 20 μm used in Example 37.

The members 1 and 2 thus joined were then subjected to the thermal cycle test in substantially the same manner as in Example 1 to evaluate durability to the thermal cycle. The results are shown in Table 15.

TABLE 15

|  | Average particle diameter of Ag particles (nm) | Au coarse particles | | | Number of duration cycles | Evaluation |
|---|---|---|---|---|---|---|
|  |  | Average particle diameter (μm) | Volume fraction (%) | Thickness of joining layer (μm) |  |  |
| Example 37 | 50 | 20 | 20 | 122 | 5000 or more | G |
| Comparative Example 50 | 50 | 10 | 20 | 125 | 1400 | NG |

Evaluation:
G: Number of duration cycles is 5000 or more
NG: Number of duration cycles is less than 5000

As is apparent from Table 15, according to the joining method of Example 37 in which the average particle diameter of the Ag particles forming the wax material 3 is 50 nm, the average particle diameter of the Au coarse particles is 20 μm, and the volume fraction of the Au coarse particles relative to the total volume of the powder mixture containing the Ag particles and the Au coarse particles is 20%, the joining layer formed of the wax material 3 can exhibit excellent durability to the thermal cycle of not less than 5000 times. Therefore, according to the joining method of Example 37, it is apparent that the $Al_2O_3$ board serving as the member 1 and having a smaller thermal expansion coefficient than that of Ag and the Cu board serving as the member 2 can be joined by the joining layer without fail.

On the other hand, according to the joining method of Comparative Example 50 in which the average particle diameter of the Au coarse particles forming the wax material 3 is smaller than 20 μm, that is, 10 μm, the joining layer formed of the wax material 3 exhibits durability of less than 5000 thermal cycles. It is apparent that sufficient durability cannot be obtained.

EXAMPLE 38

In this Example, the member ($Al_2O_3$ board) 1 and the member (Al board) 2 were joined in substantially the same manner as in Example 1 except that an $Al_2O_3$ board of 10 mm×10 mm×0.6 mm was used as the member 1 in place of the Si chip used in Example 1 and Ag particles having an average particle diameter of 50 nm were used as the wax material 3. In this Example, the same Ag foil as in Example 1 is used as the metal foil 4 to be embedded in the wax material 3 formed of Ag particles having an average particle diameter of 50 nm.

The $Al_2O_3$ board serving as the member 1 has the Ag coating layer 5 on a surface thereof, as shown in FIG. 1. The structure of the Al board serving as the member 2 is substantially the same as in Example 1.

In this Example, as shown in FIG. 1, the wax material 3 prepared in this Example is placed between the Ag coating layer 5 of the member (Al$_2$O$_3$ board) 1 and the Ag coating layer 5 of the member (Cu board) 2, and the metal foil (Ag foil) 4 is embedded in the wax material 3. Note that the thermal expansion coefficient of Al$_2$O$_3$ is 7.5 ppm/K, which is smaller than that (19.1 ppm/K) of Ag, whereas the thermal expansion coefficient of Al is 23.5 ppm/K, which is larger than that (19.1 ppm/K) of Ag.

The members 1 and 2 thus joined were then subjected to the thermal cycle test in substantially the same manner as in Example 1 to evaluate durability to the thermal cycle. The results are shown in Table 16.

EXAMPLE 39

In this Example, the member (Al$_2$O$_3$ board) 1 and the member (Al board) 2 were joined in substantially the same manner as in Example 38 except that an Au foil of 100 μm in thickness having an Ag coating layer (not shown) formed on a surface thereof by vapor deposition was used as the metal foil 4 in place of the Ag foil used in Example 38.

The members 1 and 2 thus joined were then subjected to the thermal cycle test in substantially the same manner as in Example 1 to evaluate durability to the thermal cycle. The results are shown in Table 16.

COMPARATIVE EXAMPLE 51

In this Comparative Example, the member (Al$_2$O$_3$ board) 1 and the member (Al board) 2 were joined in substantially the same manner as in Example 38 except that an SUS foil of 100 μm in thickness having an Ag coating layer (not shown) formed on a surface thereof by vapor deposition was used as the metal foil 4 in place of the Ag foil used in Example 38.

The members 1 and 2 thus joined were then subjected to the thermal cycle test in substantially the same manner as in Example 1 to evaluate durability to the thermal cycle. The results are shown in Table 16.

COMPARATIVE EXAMPLE 52

In this Comparative Example, the member (Al$_2$O$_3$ board) 1 and the member (Al board) 2 were joined in substantially the same manner as in Example 38 except that no metal foil 4 was used and the wax material 3 was solely applied by use of a screen of 200 μm.

The members 1 and 2 thus joined were then subjected to the thermal cycle test in substantially the same manner as in Example 1 to evaluate durability to the thermal cycle. The results are shown in Table 16.

TABLE 16

|  | Average particle diameter of Ag particles (nm) | Material of metal foil | Thickness of joining layer (μm) | Number of duration cycles | Evaluation |
|---|---|---|---|---|---|
| Example 38 | 50 | Ag foil | 139 | 5000 or more | G |
| Example 39 | 50 | Au foil (with Ag coating) | 131 | 5000 or more | G |
| Comparative Example 51 | 50 | SUS foil (with Ag coating) | 120 | 500 | NG |
| Comparative Example 52 | 50 | None | 128 | 2400 | NG |

Evaluation:
G: Number of duration cycles is 5000 or more
NG: Number of duration cycles is less than 5000

As is apparent from Table 16, according to the joining methods of Examples 38 and 39 in which the Ag particles having the average particle diameter of 50 nm are used as the wax material 3, an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 38 and 39, it is apparent that the Al$_2$O$_3$ board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 51 in which an SUS foil having a larger modulus of longitudinal elasticity than that of Ag is used as the metal foil 4, and the joining method of Comparative Example 52 in which no metal foil 4 is used and the wax material 3 formed of the Ag particles having an average particle diameter of 50 nm is solely used, the joining layer exhibits durability to the thermal cycle of less than 5000 times. It is apparent that sufficient durability cannot be obtained.

EXAMPLE 40

In this Example, the member (Al$_2$O$_3$ board) 1 and the member (Al board) 2 were joined in substantially the same manner as in Example 38 except that the wax material 3 was prepared from a powder mixture containing Ag particles having an average particle diameter of 50 nm and Ag coarse particles having an average particle diameter of 30 μm in place of the wax material 3 solely formed of the Ag particles having an average particle diameter of 50 nm used in Example 38; no metal foil 4 was used; and the wax material 3 prepared in this Example was applied by use of a screen of 200 μm in thickness. In the wax material 3, the volume fraction of the Ag coarse particles relative to the total volume of the powder mixture was set at 10%.

In this Example, as shown in FIG. 3, the wax material 3 prepared in this Example is solely placed between the Ag coating layer 5 of the member (Al₂O₃ board) 1 and the Ag coating layer 5 of the member (Al board) 2, and no metal foil 4 is provided.

The members 1 and 2 thus joined were then subjected to the thermal cycle test in substantially the same manner as in Example 1 to evaluate durability to the thermal cycle. The results are shown in Table 17.

COMPARATIVE EXAMPLE 53

In this Comparative Example, the member (Al₂O₃ board) 1 and the member (Al board) 2 were joined in substantially the same manner as in Example 40 except that the wax material 3 was prepared by setting the volume fraction of the Ag coarse particles having an average particle diameter of 30 μm used in Example 40 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 17.

wax material 3 exhibits durability of less than 5000 thermal cycles. It is apparent that sufficient durability cannot be obtained.

EXAMPLE 41

In this Example, the member (Al₂O₃ board) 1 and the member (Al board) 2 were joined in substantially the same manner as in Example 38 except that the wax material 3 was prepared from a powder mixture containing Ag particles having an average particle diameter of 50 nm and Au coarse particles having an average particle diameter of 20 μm in place of the wax material 3 solely formed of the Ag particles having an average particle diameter of 50 nm used in Example 38; no metal foil 4 was used; and the wax material 3 prepared in this Example was applied by use of a screen of 200 μm in thickness. In the wax material 3, the volume fraction of the Au coarse particles relative to the total volume of the powder mixture was set at 20%.

In this Example, as shown in FIG. 3, the wax material 3 prepared in this Example is solely placed between the Ag

TABLE 17

| | Average particle diameter of Ag particles (nm) | Ag coarse particles | | Thickness of joining layer (μm) | Number of duration cycles | Evaluation |
|---|---|---|---|---|---|---|
| | | Average particle diameter (μm) | Volume fraction (%) | | | |
| Example 40 | 50 | 30 | 10 | 121 | 5000 or more | G |
| Comparative Example 53 | 50 | 30 | 5 | 122 | 1300 | NG |

Evaluation:
G: Number of duration cycles is 5000 or more
NG: Number of duration cycles is less than 5000

As is apparent from Table 17, according to the joining method of Example 40 in which the average particle diameter of the Ag particles forming the wax material 3 is 50 nm, the average particle diameter of the Ag coarse particles is 30 μm, and the volume fraction of the Ag coarse particles relative to the total volume of the powder mixture containing the Ag particles and the Ag coarse particles is 10%, the joining layer formed of the wax material 3 can exhibit excellent durability to the thermal cycle of not less than 5000 times. Therefore, according to the joining method of Example 40, it is apparent that the Al₂O₃ board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 53 in which the volume fraction of the Ag coarse particles relative to the total volume of the powder mixture containing the Ag particles and Ag coarse particles is smaller than 10%, that is, 5%, the joining layer formed of the coating layer 5 of the member (Al₂O₃ board) 1 and the Ag coating layer 5 of the member (Al board) 2, and no metal foil 4 is provided.

The members 1 and 2 thus joined were then subjected to the thermal cycle test in substantially the same manner as in Example 1 to evaluate durability to the thermal cycle. The results are shown in Table 18.

COMPARATIVE EXAMPLE 54

In this Comparative Example, the member (Al₂O₃ board) 1 and the member (Al board) 2 were joined in substantially the same manner as in Example 41 except that the wax material 3 was prepared by Au coarse particles having an average particle diameter of 10 μm in place of the Au coarse particles having an average particle diameter of 20 μm used in Example 41.

The members 1 and 2 thus joined were then subjected to the thermal cycle test in substantially the same manner as in Example 1 to evaluate durability to the thermal cycle. The results are shown in Table 18.

TABLE 18

| | Average particle diameter of Ag particles (nm) | Au coarse particles Average particle diameter (μm) | Volume fraction (%) | Thickness of joining layer (μm) | Number of duration cycles | Evaluation |
|---|---|---|---|---|---|---|
| Example 41 | 50 | 20 | 20 | 124 | 5000 or more | G |
| Comparative Example 54 | 50 | 10 | 20 | 138 | 1500 | NG |

Evaluation:
G: Number of duration cycles is 5000 or more
NG: Number of duration cycles is less than 5000

As is apparent from Table 18, according to the joining method of Example 41 in which the average particle diameter of the Ag particles forming the wax material 3 is 50 nm, the average particle diameter of the Au coarse particles is 20 μm, and the volume fraction of the Au coarse particles relative to the total volume of the powder mixture containing the Ag particles and the Au coarse particles is 20%, the joining layer formed of the wax material 3 can exhibit excellent durability to the thermal cycle of not less than 5000 times. Therefore, according to the joining method of Example 41 it is apparent that the $Al_2O_3$ board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 54 in which the average particle diameter of the Au coarse particles forming the wax material 3 is smaller than 20 μm, that is, 10 μm, the joining layer formed of the wax material 3 exhibits durability of less than 5000 thermal cycles. It is apparent that sufficient durability cannot be obtained.

EXAMPLE 42

In this Example, the member (AlN board) 1 and the member (Cu board) 2 were joined in substantially the same manner as in Example 1 except that an AlN board of 10 mm×10 mm×0.6 mm was used as the member 1 in place of the Si chip used in Example 1, a Cu board was used as the member 2 in place of the Al board used in Example 1, and Ag particles having an average particle diameter of 50 nm were used as the wax material 3. In this Example, the same Ag foil as in Example 1 is used as the metal foil 4 to be embedded in the wax material 3 formed of Ag particles having an average particle diameter of 50 nm.

The AlN board serving as the member 1 has the Ag coating layer 5 on a surface thereof, as shown in FIG. 2. The structure of the Cu board serving as the member 2 is substantially the same as in Example 22.

In this Example, as shown in FIG. 2, the wax material 3 prepared in this Example is placed between the Ag coating layer 5 of the member (AlN board) 1 and the member (Cu board) 2, and the metal foil (Ag foil) 4 is embedded in the wax material 3. Note that the thermal expansion coefficient of AlN was 4.5 ppm/K and the thermal expansion coefficient of Cu was 17.0 ppm/K. Each of them is smaller than that (19.1 ppm/K) of Ag.

The members 1 and 2 thus joined were then subjected to the thermal cycle test in substantially the same manner as in Example 1 to evaluate durability to the thermal cycle. The results are shown in Table 19.

EXAMPLE 43

In this Example, the member (AlN board) 1 and the member (Cu board) 2 were joined in substantially the same manner as in Example 42 except that an Au foil of 100 μm in thickness having an Ag coating layer (not shown) formed on a surface thereof by vapor deposition was used as the metal foil 4 in place of the Ag foil used in Example 42.

The members 1 and 2 thus joined were then subjected to the thermal cycle test in substantially the same manner as in Example 1 to evaluate durability to the thermal cycle. The results are shown in Table 19.

COMPARATIVE EXAMPLE 55

In this Comparative Example, the member (AlN board) 1 and the member (Cu board) 2 were joined in substantially the same manner as in Example 42 except that an SUS foil of 100 μm in thickness having an Ag coating layer (not shown) formed on a surface thereof by vapor deposition was used as the metal foil 4 in place of the Ag foil used in Example 42.

The members 1 and 2 thus joined were then subjected to the thermal cycle test in substantially the same manner as in Example 1 to evaluate durability to the thermal cycle. The results are shown in Table 19.

COMPARATIVE EXAMPLE 56

In this Comparative Example, the member (AlN board) 1 and the member (Cu board) 2 were joined in substantially the same manner as in Example 42 except that no metal foil 4 was used and the wax material 3 was applied by use of a screen of 200 μm in thickness.

The members 1 and 2 thus joined were then subjected to the thermal cycle test in substantially the same manner as in Example 1 to evaluate durability to the thermal cycle. The results are shown in Table 19.

TABLE 19

|  | Average particle diameter of Ag particles (nm) | Material of metal foil | Thickness of joining layer (μm) | Number of duration cycles | Evaluation |
|---|---|---|---|---|---|
| Example 42 | 50 | Ag foil | 131 | 5000 or more | G |
| Example 43 | 50 | Au foil (with Ag coating) | 139 | 5000 or more | G |
| Comparative Example 55 | 50 | SUS foil (with Ag coating) | 123 | 600 | NG |
| Comparative Example 56 | 50 | None | 125 | 2300 | NG |

Evaluation:
G: Number of duration cycles is 5000 or more
NG: Number of duration cycles is less than 5000

As is apparent from Table 19, according to the joining methods of Examples 42 and 43 in which the Ag particles having the average particle diameter of 50 nm are used as the wax material 3, an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 42 and 42, it is apparent that the AlN board serving as the member 1 and having a smaller thermal expansion coefficient than that of Ag and the Cu board serving as the member 2 can be joined by the joining layer without fail.

On the other hand, according to the joining method of Comparative Example 55 in which an SUS foil having a larger modulus of longitudinal elasticity than that of Ag is used as the metal foil 4, and the joining method of Comparative Example 56 in which no metal foil 4 is used and the wax material 3 formed of the Ag particles having an average particle diameter of 50 nm is solely used, the joining layer exhibits durability to the thermal cycle of less than 5000 times. It is apparent that sufficient durability cannot be obtained.

EXAMPLE 44

In this Example, the member (AlN board) 1 and the member (Cu board) 2 were joined in substantially the same manner as in Example 42 except that the wax material 3 was prepared from a powder mixture containing Ag particles having an average particle diameter of 50 nm and Ag coarse particles having an average particle diameter of 30 μm in place of the wax material 3 solely formed of the Ag particles having an average particle diameter of 50 nm used in Example 42; no metal foil 4 was used; and the wax material 3 prepared in this Example was applied by use of a screen of 200 μm in thickness. In the wax material 3, the volume fraction of the Ag coarse particles relative to the total volume of the powder mixture was set at 10%.

In this Example, as shown in FIG. 4, the wax material 3 prepared in this Example is solely placed between the Ag coating layer 5 of the member (AlN board) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 20.

COMPARATIVE EXAMPLE 57

In this Comparative Example, the member (AlN board) 1 and the member (Cu board) 2 were joined in substantially the same manner as in Example 44 except that the wax material 3 was prepared by setting the volume fraction of the Ag coarse particles having an average particle diameter of 30 μm used in Example 44 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 20.

TABLE 20

|  |  | Ag coarse particles | | | | |
|---|---|---|---|---|---|---|
|  | Average particle diameter of Ag particles (nm) | Average particle diameter (μm) | Volume fraction (%) | Thickness of joining layer (μm) | Number of duration cycles | Evaluation |
| Example 44 | 50 | 30 | 10 | 121 | 5000 or more | G |
| Comparative Example 57 | 50 | 30 | 5 | 129 | 1100 | NG |

Evaluation:
G: Number of duration cycles is 5000 or more
NG: Number of duration cycles is less than 5000

As is apparent from Table 20, according to the joining method of Example 44 in which the average particle diameter of the Ag particles forming the wax material 3 is 50 nm, the average particle diameter of the Ag coarse particles is 30 μm, and the volume fraction of the Ag coarse particles relative to the total volume of the powder mixture containing the Ag particles and the Ag coarse particles is 10%, the joining layer formed of the wax material 3 can exhibit excellent durability to the thermal cycle of not less than 5000 times. Therefore, according to the joining method of Example 44, it is apparent that the AlN board serving as the member 1 and having a smaller thermal expansion coefficient than that of Ag and the Cu board serving as the member 2 can be joined by the joining layer without fail.

On the other hand, according to the joining method of Comparative Example 57 in which the volume fraction of the Ag coarse particles relative to the total volume of the powder mixture containing the Ag particles and Ag coarse particles is smaller than 10%, that is, 5%, the joining layer formed of the wax material 3 exhibits durability of less than 5000 thermal cycles. It is apparent that sufficient durability cannot be obtained.

EXAMPLE 45

In this Example, the member (AlN board) 1 and the member (Cu board) 2 were joined in substantially the same manner as in Example 42 except that the wax material 3 was prepared from a powder mixture containing Ag particles having an average particle diameter of 50 nm and Au coarse particles having an average particle diameter of 20 μm in place of the wax material 3 solely formed of the Ag particles having an average particle diameter of 50 nm used in Example 42; no metal foil 4 was used; and the wax material 3 prepared in this Example was applied by use of a screen of 200 μm in thickness. In the wax material 3, the volume fraction of the Au coarse particles relative to the total volume of the powder mixture was set at 20%.

In this Example, as shown in FIG. 4, the wax material 3 prepared in this Example is solely placed between the Ag coating layer 5 of the member (AlN board) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 21.

COMPARATIVE EXAMPLE 58

In this Comparative Example, the member (AlN board) 1 and the member (Cu board) 2 were joined in substantially the same manner as in Example 45 except that the wax material 3 was prepared by use of Au coarse particles having an average particle diameter of 10 μm in place of the Au coarse particles having an average particle diameter of 20 μm used in Example 45.

The members 1 and 2 thus joined were then subjected to the thermal cycle test in substantially the same manner as in Example 1 to evaluate durability to the thermal cycle. The results are shown in Table 21.

TABLE 21

|  | Average particle diameter of Ag particles (nm) | Au coarse particles | | Thickness of joining layer (μm) | Number of duration cycles | Evaluation |
|---|---|---|---|---|---|---|
|  |  | Average particle diameter (μm) | Volume fraction (%) |  |  |  |
| Example 45 | 50 | 20 | 20 | 124 | 5000 or more | G |
| Comparative Example 58 | 50 | 10 | 20 | 139 | 1300 | NG |

Evaluation:
G: Number of duration cycles is 5000 or more
NG: Number of duration cycles is less than 5000

As is apparent from Table 21, according to the joining method of Example 45 in which the average particle diameter of the Ag particles forming the wax material 3 is 50 nm, the average particle diameter of the Au coarse particles is 20 μm, and the volume fraction of the Au coarse particles relative to the total volume of the powder mixture containing the Ag particles and the Au coarse particles is 20%, the joining layer formed of the wax material 3 can exhibit excellent durability to the thermal cycle of not less than 5000 times. Therefore, according to the joining method of Example 45, it is apparent that the AlN board serving as the member 1 and having a smaller thermal expansion coefficient than that of Ag and the Cu board serving as the member 2 can be joined by the joining layer without fail.

On the other hand, according to the joining method of Comparative Example 58 in which the average particle diameter of the Au coarse particles forming the wax material 3 is smaller than 20 μm, that is, 10 μm, the joining layer formed of the wax material 3 exhibits durability of less than 5000 thermal cycles. It is apparent that sufficient durability cannot be obtained.

EXAMPLE 46

In this Example, the member (AlN board) 1 and the member (Al board) 2 were joined in substantially the same manner as in Example 1 except that an AlN board of 10 mm×10 mm×0.6 mm was used as the member 1 in place of the Si chip used in Example 1 and Ag particles having an average particle diameter of 50 nm were used as the wax material 3. In this Example, the same Ag foil as in Example 1 is used as the metal foil 4 to be embedded in the wax material 3 formed of Ag particles having an average particle diameter of 50 nm.

The AlN board serving as the member 1 has the Ag coating layer 5 on a surface thereof, as shown in FIG. 1. The structure of the Al board serving as the member 2 is substantially the same as in Example 1.

In this Example, as shown in FIG. 1, the wax material 3 prepared in this Example is placed between the Ag coating layer 5 of the member (AlN board) 1 and the Ag coating layer 5 of the member (Al board) 2, and the metal foil (Ag foil) 4 is embedded in the wax material 3. Note that the thermal expansion coefficient of AlN is 4.5 ppm/K, which is smaller than that (19.1 ppm/K) of Ag, whereas the thermal expansion coefficient of Al is 23.5 ppm/K, which is larger than that (19.1 ppm/K) of Ag.

The members 1 and 2 thus joined were then subjected to the thermal cycle test in substantially the same manner as in Example 1 to evaluate durability to the thermal cycle. The results are shown in Table 22.

EXAMPLE 47

In this Example, the member (AlN board) 1 and the member (Al board) 2 were joined in substantially the same manner as in Example 46 except that an Au foil of 100 μm in thickness having an Ag coating layer (not shown) formed on a surface thereof by vapor deposition was used as the metal foil 4 in place of the Ag foil used in Example 46.

The members 1 and 2 thus joined were then subjected to the thermal cycle test in substantially the same manner as in Example 1 to evaluate durability to the thermal cycle. The results are shown in Table 22.

COMPARATIVE EXAMPLE 59

In this Comparative Example, the member (AlN board) 1 and the member (Al board) 2 were joined in substantially the same manner as in Example 46 except that an SUS foil of 100 μm in thickness having an Ag coating layer (not shown) formed on a surface thereof by vapor deposition was used as the metal foil 4 in place of the Ag foil used in Example 46.

The members 1 and 2 thus joined were then subjected to the thermal cycle test in substantially the same manner as in Example 1 to evaluate durability to the thermal cycle. The results are shown in Table 22.

COMPARATIVE EXAMPLE 60

In this Comparative Example, the member (AlN board) 1 and the member (Al board) 2 were joined in substantially the same manner as in Example 46 except that no metal foil 4 was used and the wax material 3 was solely applied by use of a screen of 200 μm.

The members 1 and 2 thus joined were then subjected to the thermal cycle test in substantially the same manner as in Example 1 to evaluate durability to the thermal cycle. The results are shown in Table 22.

TABLE 22

|  | Average particle diameter of Ag particles (nm) | Material of metal foil | Thickness of joining layer (μm) | Number of duration cycles | Evaluation |
| --- | --- | --- | --- | --- | --- |
| Example 46 | 50 | Ag foil | 139 | 5000 or more | G |
| Example 47 | 50 | Au foil (with Ag coating) | 131 | 5000 or more | G |
| Comparative Example 59 | 50 | SUS foil (with Ag coating) | 130 | 700 | NG |
| Comparative Example 60 | 50 | None | 121 | 2500 | NG |

Evaluation:
G: Number of duration cycles is 5000 or more
NG: Number of duration cycles is less than 5000

As is apparent from Table 22, according to the joining methods of Examples 46 and 47 in which the Ag particles having the average particle diameter of 50 nm are used as the wax material 3, an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 46 and 47, it is apparent that the AlN board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 59 in which an SUS foil having a larger modulus of longitudinal elasticity than that of Ag is used as the metal foil 4, and the joining method of Comparative Example 60 in which no metal foil 4 is used and the wax material 3 formed of the Ag particles having an average particle diameter of 50 nm is solely used, the joining layer exhibits durability to the thermal cycle of less than 5000 times. It is apparent that sufficient durability cannot be obtained.

EXAMPLE 48

In this Example, the member (AlN board) 1 and the member (Al board) 2 were joined in substantially the same manner as in Example 46 except that the wax material 3 was prepared from a powder mixture containing Ag particles having an average particle diameter of 50 nm and Ag coarse particles having an average particle diameter of 30 μm in place of the wax material 3 solely formed of the Ag particles having an average particle diameter of 50 nm used in Example 46; no metal foil 4 was used; and the wax material 3 prepared in this Example was applied by use of a screen of 200 μm in thickness. In the wax material 3, the volume fraction of the Ag coarse particles relative to the total volume of the powder mixture was set at 10%.

In this Example, as shown in FIG. 3, the wax material 3 prepared in this Example is solely placed between the Ag coating layer 5 of the member (AlN board) 1 and the Ag coating layer 5 of the member (Al board) 2, and no metal foil 4 is provided.

The members 1 and 2 thus joined were then subjected to the thermal cycle test in substantially the same manner as in Example 1 to evaluate durability to the thermal cycle. The results are shown in Table 23.

COMPARATIVE EXAMPLE 61

In this Comparative Example, the member (AlN board) 1 and the member (Al board) 2 were joined in substantially the same manner as in Example 48 except that the wax material 3 was prepared by setting the volume fraction of the Ag coarse particles having an average particle diameter of 30 μm used in Example 48 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 23.

Al board serving as the member 2 and having a larger thermal expansion coefficient than that of Ag can be joined by the joining layer without fail.

On the other hand, according to the joining method of Comparative Example 61 in which the volume fraction of the Ag coarse particles relative to the total volume of the powder mixture containing the Ag particles and Ag coarse particles is smaller than 10%, that is, 5%, the joining layer formed of the wax material 3 exhibits durability of less than 5000 thermal cycles. It is apparent that sufficient durability cannot be obtained.

EXAMPLE 49

In this Example, the member (AlN board) 1 and the member (Al board) 2 were joined in substantially the same manner as in Example 46 except that the wax material 3 was prepared from a powder mixture containing Ag particles having an average particle diameter of 50 nm and Au coarse particles having an average particle diameter of 20 μm in place of the wax material 3 solely formed of the Ag particles having an average particle diameter of 50 nm used in Example 46; no metal foil 4 was used; and the wax material 3 prepared in this Example was applied by use of a screen of 200 μm in thickness. In the wax material 3, the volume fraction of the Au coarse particles relative to the total volume of the powder mixture was set at 20%.

In this Example, as shown in FIG. 3, the wax material 3 prepared in this Example is solely placed between the Ag coating layer 5 of the member (AlN board) 1 and the Ag coating layer 5 of the member (Al board) 2, and no metal foil 4 is provided.

TABLE 23

| | | Ag coarse particles | | | | |
| --- | --- | --- | --- | --- | --- | --- |
| | Average particle diameter of Ag particles (nm) | Average particle diameter (μm) | Volume fraction (%) | Thickness of joining layer (μm) | Number of duration cycles | Evaluation |
| Example 48 | 50 | 30 | 10 | 139 | 5000 or more | G |
| Comparative Example 61 | 50 | 30 | 5 | 129 | 1100 | NG |

Evaluation:
G: Number of duration cycles is 5000 or more
NG: Number of duration cycles is less than 5000

As is apparent from Table 23, according to the joining method of Example 48 in which the average particle diameter of the Ag particles forming the wax material 3 is 50 nm, the average particle diameter of the Ag coarse particles is 30 μm, and the volume fraction of the Ag coarse particles relative to the total volume of the powder mixture containing the Ag particles and the Ag coarse particles is 10%, the joining layer formed of the wax material 3 can exhibit excellent durability to the thermal cycle of not less than 5000 times. Therefore, according to the joining method of Example 48, it is apparent that the AlN board serving as the member 1 and having a smaller thermal expansion coefficient than that of Ag and the The members 1 and 2 thus joined were then subjected to the thermal cycle test in substantially the same manner as in Example 1 to evaluate durability to the thermal cycle. The results are shown in Table 24.

COMPARATIVE EXAMPLE 62

In this Comparative Example, the member (AlN board) 1 and the member (Al board) 2 were joined in substantially the same manner as in Example 49 except that the wax material 3 was prepared by Au coarse particles having an average particle diameter of 10 μm in place of the Au coarse particles having an average particle diameter of 20 μm used in Example 49.

The members 1 and 2 thus joined were then subjected to the thermal cycle test in substantially the same manner as in Example 1 to evaluate durability to the thermal cycle. The results are shown in Table 24.

TABLE 24

|  | Average particle diameter of Ag particles (nm) | Au coarse particles | | Thickness of joining layer (μm) | Number of duration cycles | Evaluation |
|---|---|---|---|---|---|---|
|  |  | Average particle diameter (μm) | Volume fraction (%) |  |  |  |
| Example 49 | 50 | 20 | 20 | 119 | 5000 or more | G |
| Comparative Example 62 | 50 | 10 | 20 | 130 | 1500 | NG |

Evaluation:
G: Number of duration cycles is 5000 or more
NG: Number of duration cycles is less than 5000

As is apparent from Table 24, according to the joining method of Example 49 in which the average particle diameter of the Ag particles forming the wax material 3 is 50 nm, the average particle diameter of the Au coarse particles is 20 μm, and the volume fraction of the Au coarse particles relative to the total volume of the powder mixture containing the Ag particles and the Au coarse particles is 20%, the joining layer formed of the wax material 3 can exhibit excellent durability to the thermal cycle of not less than 5000 times. Therefore, according to the joining method of Example 49, it is apparent that the AlN board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 62 in which the average particle diameter of the Au coarse particles forming the wax material 3 is smaller than 20 μm, that is, 10 μm, the joining layer formed of the wax material 3 exhibits durability of less than 5000 thermal cycles. It is apparent that sufficient durability cannot be obtained.

EXAMPLE 50

In this Example, the member ($Si_3N_4$ board) 1 and the member (Cu board) 2 were joined in substantially the same manner as in Example 1 except that an $Si_3N_4$ board of 10 mm×10 mm×0.6 mm was used as the member 1 in place of the Si chip used in Example 1, a Cu board was used as the member 2 in place of the Al board used in Example 1, and Ag particles having an average particle diameter of 50 nm were used as the wax material 3. In this Example, the same Ag foil as in Example 1 is used as the metal foil 4 to be embedded in the wax material 3 formed of Ag particles having an average particle diameter of 50 nm.

The $Si_3N_4$ board serving as the member 1 has the Ag coating layer 5 on a surface thereof, as shown in FIG. 2. The structure of the Cu board serving as the member 2 is substantially the same as in Example 22.

In this Example, as shown in FIG. 2, the wax material 3 prepared in this Example is placed between the Ag coating layer 5 of the member ($Si_3N_4$ board) 1 and the member (Cu board) 2, and the metal foil (Ag foil) 4 is embedded in the wax material 3. Note that the thermal expansion coefficient of $Si_3N_4$ is 3.0 ppm/K and the thermal expansion coefficient of Cu is 17.0 ppm/K. Each of them is smaller than that (19.1 ppm/K) of Ag.

The members 1 and 2 thus joined were then subjected to the thermal cycle test in substantially the same manner as in Example 1 to evaluate durability to the thermal cycle. The results are shown in Table 25.

EXAMPLE 51

In this Example, the member ($Si_3N_4$ board) 1 and the member (Cu board) 2 were joined in substantially the same manner as in Example 50 except that an Au foil of 100 μm in thickness having an Ag coating layer (not shown) formed on a surface thereof by vapor deposition was used as the metal foil 4 in place of the Ag foil used in Example 50.

The members 1 and 2 thus joined were then subjected to the thermal cycle test in substantially the same manner as in Example 1 to evaluate durability to the thermal cycle. The results are shown in Table 25.

COMPARATIVE EXAMPLE 63

In this Comparative Example, the member ($Si_3N_4$ board) 1 and the member (Cu board) 2 were joined in substantially the same manner as in Example 50 except that an SUS foil of 100 μm in thickness having an Ag coating layer (not shown) formed on a surface thereof by vapor deposition was used as the metal foil 4 in place of the Ag foil used in Example 50.

The members 1 and 2 thus joined were then subjected to the thermal cycle test in substantially the same manner as in Example 1 to evaluate durability to the thermal cycle. The results are shown in Table 25.

COMPARATIVE EXAMPLE 64

In this Comparative Example, the member ($Si_3N_4$ board) 1 and the member (Cu board) 2 were joined in substantially the same manner as in Example 50 except that no metal foil 4 was used and the wax material 3 was applied by use of a screen of 200 μm in thickness.

The members 1 and 2 thus joined were then subjected to the thermal cycle test in substantially the same manner as in Example 1 to evaluate durability to the thermal cycle. The results are shown in Table 25.

TABLE 25

|  | Average particle diameter of Ag particles (nm) | Material of metal foil | Thickness of joining layer (μm) | Number of duration cycles | Evaluation |
|---|---|---|---|---|---|
| Example 50 | 50 | Ag foil | 138 | 5000 or more | G |
| Example 51 | 50 | Au foil (with Ag coating) | 128 | 5000 or more | G |
| Comparative Example 63 | 50 | SUS foil (with Ag coating) | 113 | 600 | NG |
| Comparative Example 64 | 50 | None | 129 | 2200 | NG |

Evaluation:
G: Number of duration cycles is 5000 or more
NG: Number of duration cycles is less than 5000

As is apparent from Table 25, according to the joining methods of Examples 50 and 51 in which the Ag particles having the average particle diameter of 50 nm are used as the wax material 3, an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 50 and 51, it is apparent that the $Si_3N_4$ board serving as the member 1 and having a smaller thermal expansion coefficient than that of Ag and the Cu board serving as the member 2 can be joined by the joining layer without fail.

On the other hand, according to the joining method of Comparative Example 63 in which an SUS foil having a larger modulus of longitudinal elasticity than that of Ag is used as the metal foil 4, and the joining method of Comparative Example 64 in which no metal foil 4 is used and the wax material 3 formed of the Ag particles having an average particle diameter of 50 nm is solely used, the joining layer exhibits durability to the thermal cycle of less than 5000 times. It is apparent that sufficient durability cannot be obtained.

EXAMPLE 52

In this Example, the member ($Si_3N_4$ board) 1 and the member (Cu board) 2 were joined in substantially the same manner as in Example 50 except that the wax material 3 was prepared from a powder mixture containing Ag particles having an average particle diameter of 50 nm and Ag coarse particles having an average particle diameter of 30 μm in place of the wax material 3 solely formed of the Ag particles having an average particle diameter of 50 nm used in Example 50; no metal foil 4 was used; and the wax material 3 prepared in this Example was applied by use of a screen of 200 μm in thickness. In the wax material 3, the volume fraction of the Ag coarse particles relative to the total volume of the powder mixture was set at 10%.

In this Example, as shown in FIG. 4, the wax material 3 prepared in this Example is solely placed between the Ag coating layer 5 of the member ($Si_3N_4$ board) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 26.

COMPARATIVE EXAMPLE 65

In this Comparative Example, the member ($Si_3N_4$ board) 1 and the member (Cu board) 2 were joined in substantially the same manner as in Example 52 except that the wax material 3 was prepared by setting the volume fraction of the Ag coarse particles having an average particle diameter of 30 μm used in Example 52 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 26.

TABLE 26

|  |  | Ag coarse particles | | | |  |
|---|---|---|---|---|---|---|
|  | Average particle diameter of Ag particles (nm) | Average particle diameter (μm) | Volume fraction (%) | Thickness of joining layer (μm) | Number of duration cycles | Evaluation |
| Example 52 | 50 | 30 | 10 | 126 | 5000 or more | G |
| Comparative Example 65 | 50 | 30 | 5 | 133 | 1200 | NG |

Evaluation:
G: Number of duration cycles is 5000 or more
NG: Number of duration cycles is less than 5000

As is apparent from Table 26, according to the joining method of Example 52 in which the average particle diameter of the Ag particles forming the wax material 3 is 50 nm, the average particle diameter of the Ag coarse particles is 30 μm, and the volume fraction of the Ag coarse particles relative to the total volume of the powder mixture containing the Ag particles and the Ag coarse particles is 10%, the joining layer formed of the wax material 3 can exhibit excellent durability to the thermal cycle of not less than 5000 times. Therefore, according to the joining method of Example 52, it is apparent that the $Si_3N_4$ board serving as the member 1 and having a smaller thermal expansion coefficient than that of Ag and the Cu board serving as the member 2 can be joined by the joining layer without fail.

On the other hand, according to the joining method of Comparative Example 65 in which the volume fraction of the Ag coarse particles relative to the total volume of the powder mixture containing the Ag particles and Ag coarse particles is smaller than 10%, that is, 5%, the joining layer formed of the wax material 3 exhibits durability of less than 5000 thermal cycles. It is apparent that sufficient durability cannot be obtained.

EXAMPLE 53

In this Example, the member ($Si_3N_4$ board) 1 and the member (Cu board) 2 were joined in substantially the same manner as in Example 50 except that the wax material 3 was prepared from a powder mixture containing Ag particles having an average particle diameter of 50 nm and Au coarse particles having an average particle diameter of 20 μm in place of the wax material 3 solely formed of the Ag particles having an average particle diameter of 50 nm used in Example 50; no metal foil 4 was used; and the wax material 3 prepared in this Example was applied by use of a screen of 200 μm in thickness. In the wax material 3, the volume fraction of the Au coarse particles relative to the total volume of the powder mixture was set at 20%.

In this Example, as shown in FIG. 4, the wax material 3 prepared in this Example is solely placed between the Ag coating layer 5 of the member ($Si_3N_4$ board) 1 and the member (Cu board) 2, and no metal foil 4 is provided.

The members 1 and 2 thus joined were then subjected to the thermal cycle test in substantially the same manner as in Example 1 to evaluate durability to the thermal cycle. The results are shown in Table 27.

COMPARATIVE EXAMPLE 66

In this Comparative Example, the member ($Si_3N_4$ board) 1 and the member (Cu board) 2 were joined in substantially the same manner as in Example 53 except that the wax material 3 was prepared by Au coarse particles having an average particle diameter of 10 μm in place of the Au coarse particles having an average particle diameter of 20 μm used in Example 53.

The members 1 and 2 thus joined were then subjected to the thermal cycle test in substantially the same manner as in Example 1 to evaluate durability to the thermal cycle. The results are shown in Table 27.

TABLE 27

|  | Average particle diameter of Ag particles (nm) | Au coarse particles | | Thickness of joining layer (μm) | Number of duration cycles | Evaluation |
|---|---|---|---|---|---|---|
|  |  | Average particle diameter (μm) | Volume fraction (%) |  |  |  |
| Example 53 | 50 | 20 | 20 | 138 | 5000 or more | G |
| Comparative Example 66 | 50 | 10 | 20 | 122 | 1500 | NG |

Evaluation:
G: Number of duration cycles is 5000 or more
NG: Number of duration cycles is less than 5000

As is apparent from Table 27, according to the joining method of Example 53 in which the average particle diameter of the Ag particles forming the wax material 3 is 50 nm, the average particle diameter of the Au coarse particles is 20 μm, and the volume fraction of the Au coarse particles relative to the total volume of the powder mixture containing the Ag particles and the Au coarse particles is 20%, the joining layer formed of the wax material 3 can exhibit excellent durability to the thermal cycle of not less than 5000 times. Therefore, according to the joining method of Example 53, it is apparent that the $Si_3N_4$ board serving as the member 1 and having a smaller thermal expansion coefficient than that of Ag and the Cu board serving as the member 2 can be joined by the joining layer without fail.

On the other hand, according to the joining method of Comparative Example 66 in which the average particle diameter of the Au coarse particles forming the wax material 3 is smaller than 20 μm, that is, 10 μm, the joining layer formed of the wax material 3 exhibits durability of less than 5000 thermal cycles. It is apparent that sufficient durability cannot be obtained.

EXAMPLE 54

In this Example, the member ($Si_3N_4$ board) 1 and the member (Al board) 2 were joined in substantially the same manner as in Example 1 except that an $Si_3N_4$ board of 10 mm×10 mm×0.6 mm was used as the member 1 in place of the Si chip used in Example 1 and Ag particles having an average particle diameter of 50 nm were used as the wax material 3. In this Example, the same Ag foil as in Example 1 is used as the metal foil 4 to be embedded in the wax material 3 formed of Ag particles having an average particle diameter of 50 nm.

The $Si_3N_4$ board serving as the member 1 has the Ag coating layer 5 on a surface thereof, as shown in FIG. 1. The structure of the Al board serving as the member 2 is substantially the same as in Example 1.

In this Example, as shown in FIG. 1, the wax material 3 prepared in this Example is placed between the Ag coating layer 5 of the member ($Si_3N_4$ board) 1 and the Ag coating layer 5 of the member (Al board) 2, and the metal foil (Ag foil) 4 is embedded in the wax material 3. Note that the thermal expansion coefficient of $Si_3N_4$ is 3.0 ppm/K, which is smaller than that (19.1 ppm/K) of Ag, whereas the thermal expansion coefficient of Al is 23.5 ppm/K, which is larger than that (19.1 ppm/K) of Ag.

The members 1 and 2 thus joined were then subjected to the thermal cycle test in substantially the same manner as in Example 1 to evaluate durability to the thermal cycle. The results are shown in Table 28.

EXAMPLE 55

In this Example, the member ($Si_3N_4$ board) 1 and the member (Al board) 2 were joined in substantially the same manner as in Example 54 except that an Au foil of 100 μm in thickness having an Ag coating layer (not shown) formed on a surface thereof by vapor deposition was used as the metal foil 4 in place of the Ag foil used in Example 54.

The members 1 and 2 thus joined were then subjected to the thermal cycle test in substantially the same manner as in Example 1 to evaluate durability to the thermal cycle. The results are shown in Table 28.

COMPARATIVE EXAMPLE 67

In this Comparative Example, the member ($Si_3N_4$ board) 1 and the member (Al board) 2 were joined in substantially the same manner as in Example 54 except that an SUS foil of 100 μm in thickness having an Ag coating layer (not shown) formed on a surface thereof by vapor deposition was used as the metal foil 4 in place of the Ag foil used in Example 54.

The members 1 and 2 thus joined were then subjected to the thermal cycle test in substantially the same manner as in Example 1 to evaluate durability to the thermal cycle. The results are shown in Table 28.

COMPARATIVE EXAMPLE 68

In this Comparative Example, the member ($Si_3N_4$ board) 1 and the member (Al board) 2 were joined in substantially the same manner as in Example 54 except that no metal foil 4 was used and the wax material 3 was solely applied by use of a screen of 200 μm.

The members 1 and 2 thus joined were then subjected to the thermal cycle test in substantially the same manner as in Example 1 to evaluate durability to the thermal cycle. The results are shown in Table 28.

TABLE 28

|  | Average particle diameter of Ag particles (nm) | Material of metal foil | Thickness of joining layer (μm) | Number of duration cycles | Evaluation |
| --- | --- | --- | --- | --- | --- |
| Example 54 | 50 | Ag foil | 139 | 5000 or more | G |
| Example 55 | 50 | Au foil (with Ag coating) | 128 | 5000 or more | G |
| Comparative Example 67 | 50 | SUS foil (with Ag coating) | 133 | 500 | NG |
| Comparative Example 68 | 50 | None | 118 | 2500 | NG |

Evaluation:
G: Number of duration cycles is 5000 or more
NG: Number of duration cycles is less than 5000

As is apparent from Table 28, according to the joining methods of Examples 54 and 55 in which the Ag particles having the average particle diameter of 50 nm are used as the wax material 3, an Ag foil or an Au foil having a smaller modulus of longitudinal elasticity than that of Ag is used as the metal foil 4 to be embedded in the wax material 3, the joining layer formed of the wax material 3 and the metal foil 4 can exhibit excellent durability to the thermal cycle of not less than 5000 times. Therefore, according to the joining methods of Examples 54 and 55, it is apparent that the $Si_3N_4$ board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 67 in which an SUS foil having a larger modulus of longitudinal elasticity than that of Ag is used as the metal foil 4, and the joining method of Comparative Example 68 in which no metal foil 4 is used and the wax material 3 formed of the Ag particles having an average particle diameter of 50 nm is solely used, the joining layer exhibits durability to the thermal cycle of less than 5000 times. It is apparent that sufficient durability cannot be obtained.

EXAMPLE 56

In this Example, the member ($Si_3N_4$ board) 1 and the member (Al board) 2 were joined in substantially the same manner as in Example 54 except that the wax material 3 was prepared from a powder mixture containing Ag particles having an average particle diameter of 50 nm and Ag coarse particles having an average particle diameter of 30 µm in place of the wax material 3 solely formed of the Ag particles having an average particle diameter of 50 nm used in Example 54; no metal foil 4 was used; and the wax material 3 prepared in this Example was applied by use of a screen of 200 µm in thickness. In the wax material 3, the volume fraction of the Ag coarse particles relative to the total volume of the powder mixture was set at 10%.

In this Example, as shown in FIG. 3, the wax material 3 prepared in this Example is solely placed between the Ag coating layer 5 of the member ($Si_3N_4$ board) 1 and the Ag coating layer 5 of the member (Al board) 2, and no metal foil 4 is provided.

The members 1 and 2 thus joined were then subjected to the thermal cycle test in substantially the same manner as in Example 1 to evaluate durability to the thermal cycle. The results are shown in Table 29.

COMPARATIVE EXAMPLE 69

In this Comparative Example, the member ($Si_3N_4$ board) 1 and the member (Al board) 2 were joined in substantially the same manner as in Example 54 except that the wax material 3 was prepared by setting the volume fraction of the Ag coarse particles having an average particle diameter of 30 µm used in Example 54 relative to the total volume of the powder mixture containing the Ag particles and the Ag coarse particles at 5%.

The members 1 and 2 thus joined were then subjected to the thermal cycle test in substantially the same manner as in Example 1 to evaluate durability to the thermal cycle. The results are shown in Table 29.

mixture containing the Ag particles and Ag coarse particles is smaller than 10%, that is, 5%, the joining layer formed of the wax material 3 exhibits durability of less than 5000 thermal cycles. It is apparent that sufficient durability cannot be obtained.

EXAMPLE 57

In this Example, the member ($Si_3N_4$ board) 1 and the member (Al board) 2 were joined in substantially the same manner as in Example 54 except that the wax material 3 was prepared from a powder mixture containing Ag particles having an average particle diameter of 50 nm and Au coarse particles having an average particle diameter of 20 µm in place of the wax material 3 solely formed of the Ag particles having an average particle diameter of 50 nm used in Example 54; no metal foil 4 was used; and the wax material 3 prepared in this Example was applied by use of a screen of 200 µm in thickness. In the wax material 3, the volume fraction of the Au coarse particles relative to the total volume of the powder mixture was set at 20%.

In this Example, as shown in FIG. 3, the wax material 3 prepared in this Example is solely placed between the Ag coating layer 5 of the member ($Si_3N_4$ board) 1 and the Ag coating layer 5 of the member (Al board) 2, and no metal foil 4 is provided.

The members 1 and 2 thus joined were then subjected to the thermal cycle test in substantially the same manner as in

TABLE 29

| | | Ag coarse particles | | | |
|---|---|---|---|---|---|
| | Average particle diameter of Ag particles (nm) | Average particle diameter (µm) | Volume fraction (%) | Thickness of joining layer (µm) | Number of duration cycles | Evaluation |
| Example 56 | 50 | 30 | 10 | 119 | 5000 or more | G |
| Comparative Example 69 | 50 | 30 | 5 | 122 | 1400 | NG |

Evaluation:
G: Number of duration cycles is 5000 or more
NG: Number of duration cycles is less than 5000

As is apparent from Table 29, according to the joining method of Example 56 in which the average particle diameter of the Ag particles forming the wax material 3 is 50 nm, the average particle diameter of the Ag coarse particles is 30 µm, and the volume fraction of the Ag coarse particles relative to the total volume of the powder mixture containing the Ag particles and the Ag coarse particles is 10%, the joining layer formed of the wax material 3 can exhibit excellent durability to the thermal cycle of not less than 5000 times. Therefore, according to the joining method of Example 56, it is apparent that the $Si_3N_4$ board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 69 in which the volume fraction of the Ag coarse particles relative to the total volume of the powder Example 1 to evaluate durability to the thermal cycle. The results are shown in Table 30.

COMPARATIVE EXAMPLE 70

In this Comparative Example, the member ($Si_3N_4$ board) 1 and the member (Al board) 2 were joined in substantially the same manner as in Example 57 except that the wax material 3 was prepared by Au coarse particles having an average particle diameter of 10 µm in place of the Au coarse particles having an average particle diameter of 20 µm used in Example 57.

The members 1 and 2 thus joined were then subjected to the thermal cycle test in substantially the same manner as in Example 1 to evaluate durability to the thermal cycle. The results are shown in Table 30.

TABLE 30

| | Average particle diameter of Ag particles (nm) | Au coarse particles | | Thickness of joining layer (μm) | Number of duration cycles | Evaluation |
| --- | --- | --- | --- | --- | --- | --- |
| | | Average particle diameter (μm) | Volume fraction (%) | | | |
| Example 57 | 50 | 20 | 20 | 119 | 5000 or more | G |
| Comparative Example 70 | 50 | 10 | 20 | 125 | 1300 | NG |

Evaluation:
G: Number of duration cycles is 5000 or more
NG: Number of duration cycles is less than 5000

As is apparent from Table 30, according to the joining method of Example 57 in which the average particle diameter of the Ag particles forming the wax material 3 is 50 nm, the average particle diameter of the Au coarse particles is 20 μm, and the volume fraction of the Au coarse particles relative to the total volume of the powder mixture containing the Ag particles and the Au coarse particles is 20%, the joining layer formed of the wax material 3 can exhibit excellent durability to the thermal cycle of not less than 5000 times. Therefore, according to the joining method of Example 57, it is apparent that the $Si_3N_4$ board serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 70 in which the average particle diameter of the Au coarse particles forming the wax material 3 is smaller than 20 μm, that is, 10 μm, the joining layer formed of the wax material 3 exhibits durability of less than 5000 thermal cycles. It is apparent that sufficient durability cannot be obtained.

EXAMPLE 58

In this Example, the member (Si chip) 1 and the member (Al board) 2 were joined in substantially the same manner as in Example 17 except that the wax material 3 was prepared from a powder mixture containing Ag particles having an average particle diameter of 15 nm and Au coarse particles, which had an average particle diameter of 20 μm and an Ag coating layer formed on the surface thereof and which were used in place of the Au coarse particles used in Example 17. In the wax material 3, the volume fraction of the Au coarse particles relative to the total volume of the powder mixture was set at 20%.

The Ag coating layer is formed on the surface of the Au coarse particles by sputtering. The thickness of the Ag coating layer is about 0.1 μm.

The members 1 and 2 thus joined were then subjected to the thermal cycle test in substantially the same manner as in Example 1 to evaluate durability to the thermal cycle. The results are shown in Table 31.

EXAMPLE 59

In this Example, the member (Si chip) 1 and the member (Al board) 2 were joined in substantially the same manner as in Example 58 except that the wax material 3 was prepared by use of Au coarse particles having an average particle diameter of 30 μm in place of the Au coarse particles having an average particle diameter of 20 μm used in Example 58.

The members 1 and 2 thus joined were then subjected to the thermal cycle test in substantially the same manner as in Example 1 to evaluate durability to the thermal cycle. The results are shown in Table 31.

COMPARATIVE EXAMPLE 71

In this Comparative Example, the member (Si chip) 1 and the member (Al board) 2 were joined in substantially the same manner as in Example 58 except that the wax material 3 was prepared by use of Au coarse particles having an average particle diameter of 10 μm in place of the Au coarse particles having an average particle diameter of 20 μm used in Example 58.

The members 1 and 2 thus joined were then subjected to the thermal cycle test in substantially the same manner as in Example 1 to evaluate durability to the thermal cycle. The results are shown in Table 31.

EXAMPLE 60

In this Example, the member (Si chip) 1 and the member (Al board) 2 were joined in substantially the same manner as in Example 59 except that the wax material 3 was prepared by setting the volume fraction of the Au coarse particles having an average particle diameter of 30 μm used in Example 59 relative to the total volume of the powder mixture containing the Ag particles and the Au coarse particles was set at 10%.

The members 1 and 2 thus joined were then subjected to the thermal cycle test in substantially the same manner as in Example 1 to evaluate durability to the thermal cycle. The results are shown in Table 31.

EXAMPLE 61

In this Example, the member (Si chip) 1 and the member (Al board) 2 were joined in substantially the same manner as in Example 59 except that the wax material 3 was prepared by setting the volume fraction of the Au coarse particles having an average particle diameter of 30 μm used in Example 59 relative to the total volume of the powder mixture containing the Ag particles and the Au coarse particles was set at 30%.

The members 1 and 2 thus joined were then subjected to the thermal cycle test in substantially the same manner as in Example 1 to evaluate durability to the thermal cycle. The results are shown in Table 31.

EXAMPLE 62

In this Example, the member (Si chip) 1 and the member (Al board) 2 were joined in substantially the same manner as in Example 59 except that the wax material 3 was prepared by setting the volume fraction of the Au coarse particles having an average particle diameter of 30 μm used in Example 59 relative to the total volume of the powder mixture containing the Ag particles and the Au coarse particles was set at 40%.

The members 1 and 2 thus joined were then subjected to the thermal cycle test in substantially the same manner as in Example 1 to evaluate durability to the thermal cycle. The results are shown in Table 31.

COMPARATIVE EXAMPLE 72

In this Comparative Example, the member (Si chip) 1 and the member (Al board) 2 were joined in substantially the same manner as in Example 59 except that the wax material 3 was prepared by setting the volume fraction of the Au coarse particles having an average particle diameter of 30 μm used in Example 59 relative to the total volume of the powder mixture containing the Ag particles and the Au coarse particles was set at 5%.

The members 1 and 2 thus joined were then subjected to the thermal cycle test in substantially the same manner as in Example 1 to evaluate durability to the thermal cycle. The results are shown in Table 31.

COMPARATIVE EXAMPLE 73

In this Comparative Example, the member (Si chip) 1 and the member (Al board) 2 were joined in substantially the same manner as in Example 59 except that the wax material 3 was prepared by setting the volume fraction of the Au coarse particles having an average particle diameter of 30 μm used in Example 59 relative to the total volume of the powder mixture containing the Ag particles and the Au coarse particles was set at 50%.

The members 1 and 2 thus joined were then subjected to the thermal cycle test in substantially the same manner as in Example 1 to evaluate durability to the thermal cycle. The results are shown in Table 31.

TABLE 31

| | Average particle diameter of Ag particles (nm) | Au coarse particles | | | Number of duration cycles | Evaluation |
| | | Average particle diameter (μm) | Volume fraction (%) | Thickness of joining layer (μm) | | |
|---|---|---|---|---|---|---|
| Example 58 | 15 | 20 | 20 | 133 | 5000 or more | G |
| Example 59 | 15 | 30 | 20 | 128 | 5000 or more | G |
| Comparative Example 71 | 15 | 10 | 20 | 125 | 1000 | NG |
| Example 60 | 15 | 30 | 10 | 133 | 5000 or more | G |
| Example 61 | 15 | 30 | 30 | 130 | 5000 or more | G |
| Example 62 | 15 | 30 | 40 | 131 | 5000 or more | G |
| Comparative Example 72 | 15 | 30 | 5 | 129 | 900 | NG |
| Comparative Example 73 | 15 | 30 | 50 | 127 | 900 | NG |

Evaluation:
G: Number of duration cycles is 5000 or more
NG: Number of duration cycles is less than 5000

As is apparent from Table 31, according to the joining methods of Examples 58 to 62 in which the average particle diameter of the Ag particles forming the wax material 3 is 15 nm, the Au coarse particles having a smaller modulus of longitudinal elasticity than that of Ag have a Ag coating layer on the surface thereof, the average particle diameter of the Au coarse particles is 20 to 30 μm, and the volume fraction of the Au coarse particles relative to the total volume of the powder mixture containing the Ag particles and the Au coarse particles is 10% to 40%, the joining layer formed of the wax material 3 can exhibit excellent durability to the thermal cycle of not less than 5000 times. Therefore, according to the joining methods of Examples 58 to 62, it is apparent that the Si chip serving as the member 1 and having a smaller thermal expansion coefficient than that of Ag and the Al board serving as the member 2 and having a larger thermal expansion coefficient than that of Ag can be joined by the joining layer without fail.

On the other hand, according to the joining method of Comparative Example 71 in which the average particle diameter of the Au coarse particles forming the wax material 3 is smaller than 20 μm, that is, 10 μm, Comparative Example 72 in which the volume fraction of the Au coarse particles relative to the total volume of the powder mixture containing the Ag particles and Au coarse particles is smaller than 10%, that is, 5%, and Comparative Example 73 in which the volume fraction of the Au coarse particles is larger than 40%, that is, 50%, the joining layer formed of the wax material 3 exhibits durability of less than 5000 thermal cycles. It is apparent that sufficient durability cannot be obtained.

What is claimed is:

1. A method of joining two types of members having different thermal expansion coefficients, at least one of which is smaller than that of Ag, comprising the steps of
placing Ag particles having an average particle diameter of 50 nm or less and an Ag foil or a metal foil having a smaller modulus of longitudinal elasticity than that of Ag between the two types of members, and heating to join the two types of members.

2. The method according to claim 1, wherein the Ag particles have an average particle diameter within the range of 5 to 50 nm.

3. The method according to claim 1, wherein the Ag foil or the metal foil having a smaller modulus of longitudinal elasticity than that of Ag is embedded in the Ag particles.

4. The method according to claim 1, wherein the Ag foil or the metal foil having a smaller modulus of longitudinal elasticity than that of Ag has a thickness of 20 to 200 μm.

5. The method according to claim 1, wherein the metal foil having a smaller modulus of longitudinal elasticity than that of Ag is an Al foil or an Au foil.

6. The method according to claim 1, wherein the metal foil having a smaller modulus of longitudinal elasticity than that of Ag has a coating layer formed of Ag on a surface thereof.

7. The method according to claim 1, wherein the metal foil having a smaller modulus of longitudinal elasticity than that of Ag has a plurality of throughholes uniformly formed therein.

8. The method according to claim 1, wherein a first member of the two types of members is formed of one type of material selected from the group consisting of Si, SiC, $Al_2O_3$, AlN and $Si_3N_4$ and a second member is formed of Al or Cu.

9. The method according to claim 8, wherein the first member has a coating layer formed of Ag on a surface thereof.

10. The method according to claim 8, wherein, when the second member is formed of Al, Al has an Ni plating layer formed on a surface thereof and a coating layer formed of Ag formed on the Ni plating layer.

11. A method of joining two types of members having different thermal expansion coefficients, at least one of which is smaller than that of Ag, comprising the steps of
placing a wax material, which is a powder mixture containing first Ag particles having an average particle diameter of 50 nm or less and second Ag particles or particles of a metal having a smaller modulus of longitudinal elasticity than that of Ag, between the two types of members, and heating to join the two types of members, the second Ag particles or particles of a metal having an average particle diameter of 20 μm or more and being contained in a volume fraction of 10 to 40% relative to a total volume of the powder mixture.

12. The method according to claim 11, wherein the first Ag particles have an average particle diameter within the range of 5 to 50 nm.

13. The method according to claim 11, wherein the second Ag particles or the particles of a metal having a smaller modulus of longitudinal elasticity than that of Ag have an average particle diameter within the range of 20 to 40 μm.

14. The method according to claim 11, wherein the particles of a metal having a smaller modulus of longitudinal elasticity than that of Ag are formed of Au.

15. The method according to claim 11, wherein the particles of a metal having a smaller modulus of longitudinal elasticity than that of Ag have a coating layer formed of Ag on a surface thereof.

16. The method according to claim 11, wherein a first member of the two types of members is formed of one type of material selected from the group consisting of Si, SiC, $Al_2O_3$, AlN and $Si_3N_4$ and a second member is formed of Al or Cu.

17. The method according to claim 16, wherein the first member has a coating layer formed of Ag on a surface thereof.

18. The method according to claim 16, wherein, when the second member is formed of Al, Al has an Ni plating layer formed on a surface thereof and a coating layer formed of Ag formed on the Ni plating layer.

* * * * *